US012748998B2

(12) United States Patent
Hoskinson

(10) Patent No.: US 12,748,998 B2
(45) Date of Patent: Sep. 29, 2026

(54) SYSTEMS AND METHODS FOR ACTIVE NOISE COMPENSATION OF QUBITS

(71) Applicant: 1372934 B.C. LTD., Burnaby (CA)

(72) Inventor: Emile M. Hoskinson, Vancouver (CA)

(73) Assignee: 1372934 B.C. LTD., Burnaby (CA)

( * ) Notice: Subject to any disclaimer, the term of this patent is extended or adjusted under 35 U.S.C. 154(b) by 25 days.

(21) Appl. No.: 19/106,335

(22) PCT Filed: Aug. 29, 2023

(86) PCT No.: PCT/US2023/073045
§ 371 (c)(1),
(2) Date: Feb. 25, 2025

(87) PCT Pub. No.: WO2024/050333
PCT Pub. Date: Mar. 7, 2024

(65) Prior Publication Data

US 2025/0356235 A1 Nov. 20, 2025

Related U.S. Application Data

(60) Provisional application No. 63/403,513, filed on Sep. 2, 2022.

(51) Int. Cl.
*G06N 10/40* (2022.01)
*B82Y 10/00* (2011.01)

(52) U.S. Cl.
CPC .............. *G06N 10/40* (2022.01); *B82Y 10/00* (2013.01)

(58) Field of Classification Search
CPC ................................ G06N 10/40; B82Y 10/00
USPC ............................................................... 326/5
See application file for complete search history.

(56) References Cited

U.S. PATENT DOCUMENTS 7,843,209 B2 11/2010 Berkley
8,098,179 B2 1/2012 Bunyk
8,169,231 B2 5/2012 Berkley
8,854,074 B2 10/2014 Berkley
9,015,215 B2 4/2015 Berkley
10,528,886 B2 1/2020 Boothby
(Continued)

FOREIGN PATENT DOCUMENTS

WO 2022155140 A1 7/2022

OTHER PUBLICATIONS

Lanting, Probing Environmental Spin Polarization with Superconducting Flux Qubits, arXiv:2003.14244v1, Mar. 31, 2020.
(Continued)

*Primary Examiner* — Arnold M Kinkead
(74) *Attorney, Agent, or Firm* — Cozen O'Connor

(57) ABSTRACT

A quantum processor is discussed, the quantum processor having a flux compensation circuit communicatively coupled to a first qubit. The flux compensation circuit includes a quantum flux parametron (QFP) flux pump circuit with a first QFP in communication with the first qubit and a storage circuit with a second Josephson junction and a storage loop coupled in series with the QFP flux pump circuit. The communication between the QFP flux pump circuit and the storage loop is mediated by the second Josephson junction. A first control line is in communication with the first Josephson junction and a second control line is in communication with the second Josephson junction. In use, flux stored in the storage loop back acts on the first qubit.

19 Claims, 13 Drawing Sheets

(56) References Cited

U.S. PATENT DOCUMENTS

| | | | | |
|---|---|---|---|---|
| 10,552,755 | B2 | 2/2020 | Lanting | |
| 10,938,346 | B2 | 3/2021 | Berkley | |
| 11,127,893 | B2 | 9/2021 | Johnson | |
| 11,424,521 | B2 | 8/2022 | Whittaker | |
| 11,494,683 | B2 | 11/2022 | Amin | |
| 2002/0060635 | A1 | 5/2002 | Gupta | |
| 2009/0153381 | A1 | 6/2009 | Kirichenko | |
| 2011/0060780 | A1 | 3/2011 | Berkley | |
| 2015/0111754 | A1* | 4/2015 | Harris | H03K 3/38 365/162 |
| 2015/0219730 | A1 | 8/2015 | Tsukamoto | |
| 2015/0379418 | A1* | 12/2015 | Harris | G06N 10/40 |
| 2016/0132785 | A1 | 5/2016 | Amin | |
| 2020/0090738 | A1 | 3/2020 | Naaman | |
| 2020/0401649 | A1 | 12/2020 | Lanting | |
| 2021/0248506 | A1 | 8/2021 | Hoskinson | |
| 2022/0020913 | A1 | 1/2022 | Harris | |
| 2022/0374755 | A1 | 11/2022 | Didier | |
| 2024/0020562 | A1 | 1/2024 | Miano et al. | |
| 2025/0342379 | A1* | 11/2025 | Naaman | G06N 10/40 |

OTHER PUBLICATIONS

Anton, Magnetic Flux Noise in do SQUIDs: Temperature and Geometry Dependence, Physical Review Letters, 110, 147002, Apr. 5, 2013.

Averin, Variable Electrostatic Transformer: Controllable Coupling of Two Charge Qubits, Physical Review Letters 91 (5): 057003-1-057003-4, Aug. 1, 2003.

Bao, Fluxonium: an alternative qubit platform for high-fidelity operations, arXiv:2111.13504v2 [quant-ph], Dec. 23, 2021.

Barends, Logic Gates at the Surface Code Threshold: Superconducting Qubits Poised for Fault-tolerant Quantum Computing, arXiv:1402.4848 [quant-ph], 2014.

Blatter, Design aspects of superconducting-phase quantum bits, Physical Review B 63: 174511-1-174511-9, 2001.

Chamberland, Building A Fault-Tolerant Quantum Computer Using Concatenated Cat Codes, 2022.

Chancellor, Circuit Design for Multi-boy Interactions in Superconducting Quantum Annealing Systems with Applications to a Scalable Architecture, arXiv:1603.09521v5, Oct. 13, 2017.

Chancellor, Scalable Universal Holonomic Quantum Computation Realized with an Adiabatic Quantum Data Bus and Potential implementation using Superconducting Flux Qubits, arXiv:1301.7100v3 [quant-ph], Mar. 21, 2013.

Clarke, Quiet Readout of Superconducting Flux States, Physica Scripta. T102, 173-177, 2002.

Clarke, Superconducting quantum bits, Nature 453:1031-1042, Jun. 19, 2008.

Cosmelli, Controllable Flux Coupling for the Integration of Flux Qubits, arXiv:cond-mat/0403690v1, Mar. 29, 2004.

Filippov, Tunable Transformer for Qubits Based on Flux States, IEEE Transactions on Applied Superconductivity, vol. 13, Issue: 2, Jun. 2003.

Harris, Experimental Investigation of an Eight-Qubit Unit Cell in a Superconducting Optimization Processor, arXiv:1004. 1628v2 [cond-mat.supr-con], Jun. 28, 2010.

International Search Report and Written Opinion, mailed Jan. 9, 2024, for PCT/US2023/073045, 9 pages.

Ko, A Novel Method For Correcting Device Parameter Mismatches In Josephson Junction Circuits, IEEE Transactions on Applied Superconductivity, vol. 3, No. 1, Mar. 1993.

Orlando, Engineering the Quantum Measurement Process For The Persistent Current Qubit, Physica C 3681294-299 (Mar. 2002).

Sandberg, Turning the field in a microwave resonator faster than then photon lifetime, Applied Physics Letters, 92(20), May 19, 2008.

Sendelbach, Complex Inductance, Excess Noise, and Surface Magnetism in dc SQUIDs, Physical Review Letters, 103, 117001, Sep. 11, 2009.

Stockklauser, Strong Coupling Cavity QED with Gate-Defined Double Quantum Dots Enabled by a High Impedance Resonator, arXiv:1701.03433v1 [cond-mat.mes-hall], Jan. 12, 2017.

* cited by examiner

SYSTEMS AND METHODS FOR ACTIVE NOISE COMPENSATION OF QUBITS

CROSS-REFERENCE TO RELATED APPLICATION

This patent application claims priority of U.S. Patent Application No. 63/403,513, filed on Sep. 2, 2022, the entire disclosure of which is hereby incorporated by reference herein for all purposes.

FIELD

This disclosure generally relates to active noise compensation for qubits, and in particular, to active flux noise compensation within a quantum processor.

BACKGROUND

Quantum Devices

Quantum devices are structures in which quantum mechanical effects are observable. Quantum devices include circuits in which current transport is dominated by quantum mechanical effects. Such devices include spintronics, and superconducting circuits. Both spin and superconductivity are quantum mechanical phenomena. Quantum devices can be used for measurement instruments, in computing machinery, and the like.

Quantum Computation

A quantum computer is a system that makes direct use of at least one quantum-mechanical phenomenon, such as superposition, tunneling, and entanglement, to perform operations on data. The elements of a quantum computer are qubits. Quantum computers can provide speedup for certain classes of computational problems such as computational problems simulating quantum physics.

Superconducting Qubits

Superconducting qubits are solid state qubits based on circuits of superconducting materials. Operation of superconducting qubits is based on the underlying principles of magnetic flux quantization and Josephson tunneling. Superconducting effects can be present in different configurations, and can give rise to different types of superconducting qubits including flux, phase, charge, and hybrid qubits. The different configurations can vary in the topology of the loops, the placement of the Josephson junctions, and the physical parameters of elements of the superconducting circuits, such as inductance, capacitance, and Josephson junction critical current.

Quantum Processor

A quantum processor may take the form of a superconducting quantum processor. A superconducting quantum processor may include a number of superconducting qubits and associated local bias devices. A superconducting quantum processor may also include coupling devices (also known as couplers) that selectively provide communicative coupling between qubits.

In one implementation, the superconducting qubit includes a superconducting loop interrupted by a Josephson junction. The inductance and the critical current can be selected, adjusted, or tuned, to increase the ratio of the inductance of the Josephson junction to the geometric inductance of the superconducting loop, and to cause the qubit to be operable as a bistable device. In some implementations, the ratio of the inductance of the Josephson junction to the geometric inductance of the superconducting loop of a qubit is approximately equal to three.

In one implementation, the superconducting coupler includes a superconducting loop interrupted by a Josephson junction. The inductance and the critical current can be selected, adjusted, or tuned, to decrease the ratio of the inductance of the Josephson junction to the geometric inductance of the superconducting loop, and to cause the coupler to be operable as a monostable device. In some implementations, the ratio of the inductance of the Josephson junction to the geometric inductance of the superconducting loop of a coupler is approximately equal to, or less than, one.

Further details and embodiments of example quantum processors that may be used in conjunction with the present systems and devices are described in, for example, U.S. Pat. Nos. 7,533,068; 8,008,942; 8,195,596; 8,190,548; and 8,421,053.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

According to an aspect, there is provided a quantum processor comprising a first qubit, a flux compensation circuit communicatively coupled to the first qubit, the flux compensation circuit comprising: a quantum flux parametron (QFP) flux pump circuit comprising a first QFP in communication with the first qubit, the first QFP comprising a first Josephson junction, a storage circuit comprising a second Josephson junction and a storage loop coupled in series with the QFP flux pump circuit, the communication between the QFP flux pump circuit and the storage loop mediated by the second Josephson junction, a first control line in communication with the first Josephson junction, and a second control line in communication with the second Josephson junction, wherein the storage loop is communicatively coupled to the first qubit such that, in use, flux stored in the storage loop back acts on the first qubit.

According to other aspects the storage loop may be communicatively coupled to the first qubit through the first QFP, the first Josephson junction and the second Josephson junction may each comprise compound Josephson junctions, the QFP flux pump circuit may comprise a second QFP coupled in series with the first QFP, the second QFP comprising a third Josephson junction, the first QFP and the second QFP connected by an inductor, the QFP flux pump circuit may comprise a third QFP coupled in series with the second QFP, the coupling between the second QFP and the third QFP mediated by a fourth Josephson junction, the quantum processor may further comprise a third control line in communication with the third Josephson junction and a fourth control line in communication with the fourth Josephson junction, the third Josephson junction and the fourth Josephson junction may each comprise compound Josephson junctions, the quantum processor may comprise a set of qubits, the first qubit being one of the qubits of the set of qubits, and each qubit of the set of qubits may be coupled to a respective flux compensation circuit, and the storage loop may comprise a high kinetic inductance material.

According to an aspect, there is provided a flux compensation circuit comprising a quantum flux parametron (QFP) flux pump circuit comprising: a first QFP, the first QFP comprising a first Josephson junction, a second QFP connected in series with the first QFP, the second QFP comprising a third Josephson junction, the first QFP and the second QFP connected by an inductor, a third QFP connected in series with the second QFP, the connection between the second QFP and the third QFP mediated by a fourth Josephson junction, a storage circuit comprising a second Josephson junction and a storage loop connected in series with the QFP flux pump circuit, the connection between the QFP flux pump circuit and the storage loop mediated by the second Josephson junction, a first control line in communication with the first Josephson junction, a second control line in communication with the second Josephson junction, a third control line in communication with the third Josephson junction, and a fourth control line in communication with the fourth Josephson junction.

According to other aspects each of the first, second, third, and fourth Josephson junctions may comprise compound Josephson junctions, and the storage loop may comprise a high kinetic inductance material.

According to an aspect, there is provided a method of compensating flux noise in a qubit, the method comprising, iteratively, until an exit condition is met: projecting information about a flux state of the qubit into a quantum flux parametron (QFP) flux pump circuit, copying the information about the flux state of the qubit through the QFP flux pump circuit as a directional current, activating a Josephson junction coupled in series with the QFP flux pump circuit to store flux in a storage loop connected to the Josephson junction based on the directional current, and evaluating the exit condition, and communicating the flux stored in the storage loop with the qubit to reduce the flux state of the qubit.

According to other aspects, projecting information about the flux state of the qubit into a QFP flux pump circuit may comprise annealing the qubit in the presence of ambient flux noise, projecting information about the flux state of the qubit into a QFP flux pump circuit may comprise annealing a first QFP in communication with the qubit in the presence of ambient flux noise, copying the information about the flux state of the qubit through the QFP flux pump circuit as a directional current may comprise: inducing a current in a first QFP comprising a first Josephson junction based on the projected information about the flux state, activating the first Josephson junction to latch the first QFP, inducing a current in a second QFP comprising a second Josephson junction based on the current in the latched first QFP, and activating the second Josephson junction to latch the second QFP, copying the information about the flux state of the qubit through the QFP flux pump circuit as a directional current may further comprise: inducing a current in a third QFP comprising a third Josephson junction based on the current in the latched second QFP, and activating the third Josephson junction to latch the third QFP, evaluating the exit condition may comprise incrementing a counter until a number of iterations have been performed, and the method may further comprise deactivating biasing devices in communication with the qubit to isolate the qubit prior to projecting information about the flux state of the qubit.

According to an aspect, there is provided a method of compensating flux noise in a quantum processor, the quantum processor comprising a plurality of qubits, the method comprising performing any of the methods described herein for each qubit in the quantum processor.

Described herein is an error suppression technique for reducing on-chip flux noise on a per qubit basis. As used herein, "on-chip" refers to something that is part of the same processor as the qubits that are subject to the compensation. A quantum processor typically includes qubits and couplers, as well as control devices and other on-chip circuits, as discussed with respect to FIG. 2. The compensation circuit described herein provides compensation of those qubits in situ, or as part of the quantum processor. In particular, many quantum processors are maintained in an isolated environment such as a cryogenic refrigerator, and the on-chip flux noise compensation can occur without the requirement for information to be read to a separate circuit or processor that is outside of the isolated environment or at room temperature. An on-chip circuit for capturing and aggregating information about the qubit flux offset due to noise is provided that can be used to compensate that offset. The described method and devices may beneficially allow for flux noise compensation without the requirement to bring information about the qubit state off-chip or to reprogram on-chip Digital to Analog Converters (DACs). This may beneficially allow for faster and more effective compensation of low frequency flux noise. Reduction of flux noise present in each qubit may thereby reduce problem misspecification and dephasing, improving performance of the quantum processor. Reduction in flux noise may also ease the requirements for error correction in gate model quantum computing.

In other aspects, the features described above may be combined together in any reasonable combination as will be recognized by those skilled in the art.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Example Hybrid Computing System

Figure 1:
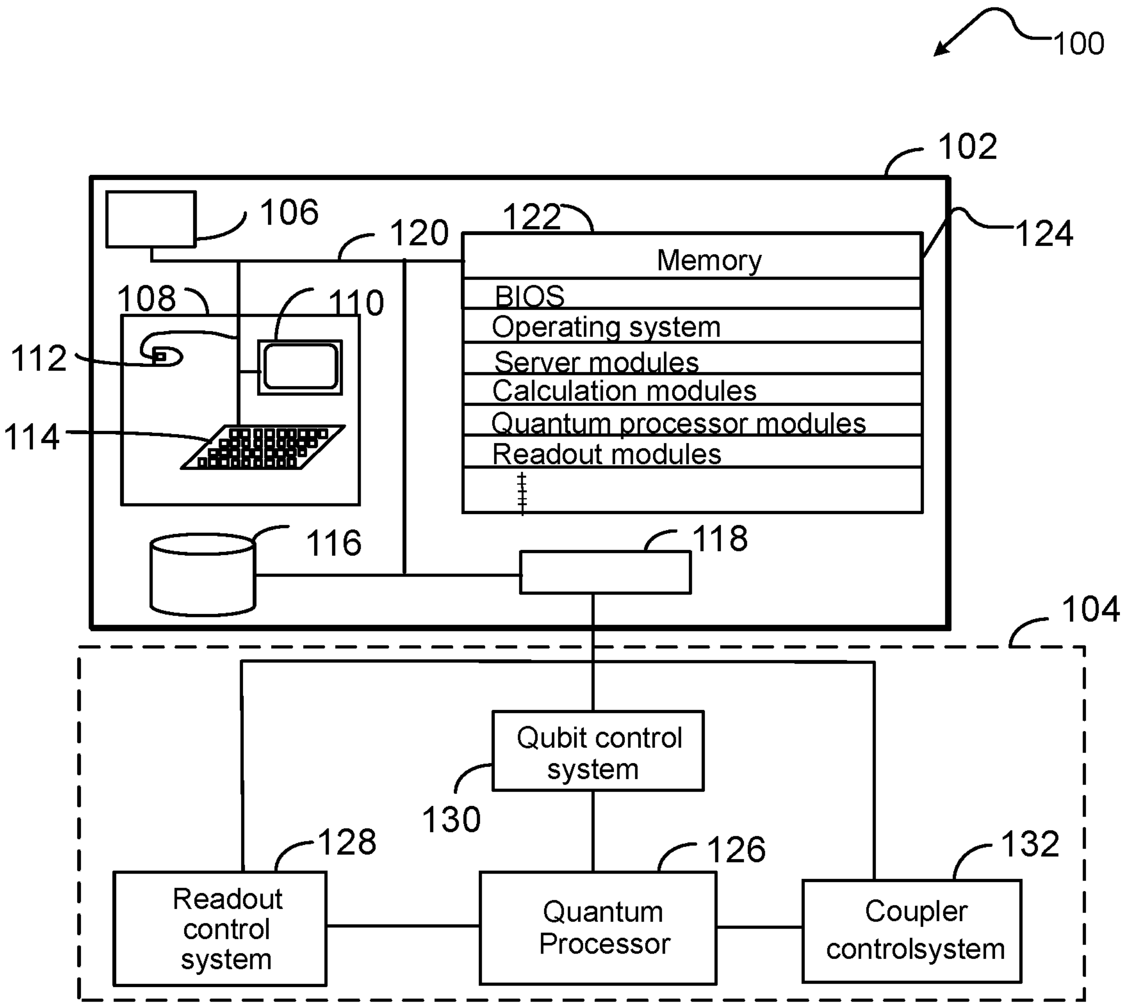
FIG. 1 is a schematic diagram of a hybrid computing system including a digital computer coupled to an analog computer, in accordance with the present systems, devices, and methods.

FIG. 1 illustrates a computing system 100 comprising a digital computer 102. Digital computer 102 includes one or more digital processors 106 that may be used to perform classical digital processing tasks. Digital computer 102 may further include at least one system memory 122, and at least one system bus 120 that couples various system components, including system memory 122 to digital processor(s) 106. System memory 122 may store one or more sets of processor-executable instructions, which may be referred to as modules 124.

The digital processor(s) 106 may be any logic processing unit or circuitry (for example, integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 126. Quantum processor 126 may include at least one superconducting integrated circuit. Digital computer 102 may communicate with analog computer 104 via, for instance, a controller 118. Certain computations may be performed by analog computer 104 at the instruction of digital computer 102, as described in greater detail herein.

Digital computer 102 may include a user input/output subsystem 108. In some implementations, user input/output subsystem 108 includes one or more user input/output components such as a display 110, mouse 112, and/or keyboard 114.

System bus 120 may employ any known bus structures or architectures, including a memory bus with a memory controller, a peripheral bus, and a local bus. System memory 122 may include non-volatile memory, such as read-only memory ("ROM"), static random-access memory ("SRAM"), Flash NAND; and volatile memory such as random-access memory ("RAM") (not shown).

Digital computer 102 may also include other non-transitory computer- or processor-readable storage media or non-volatile memory 116. Non-volatile memory 116 may take a variety of forms, including: a hard disk drive for reading from and writing to a hard disk (for example, a magnetic disk), an optical disk drive for reading from and writing to removable optical disks, and/or a solid state drive (SSD) for reading from and writing to solid state media (for example NAND-based Flash memory). Non-volatile memory 116 may communicate with digital processor(s) via system bus 120 and may include appropriate interfaces or controllers 118 coupled to system bus 120. Non-volatile memory 116 may serve as long-term storage for processor- or computer-readable instructions, data structures, or other data (sometimes called program modules or modules 124) for digital computer 102.

Although digital computer 102 has been described as employing hard disks, optical disks and/or solid-state storage media, those skilled in the relevant art will appreciate that other types of nontransitory and non-volatile computer-readable media may be employed. Those skilled in the relevant art will appreciate that some computer architectures employ nontransitory volatile memory and nontransitory non-volatile memory. For example, data in volatile memory may be cached to non-volatile memory or a solid-state disk that employs integrated circuits to provide non-volatile memory.

Figure 8:
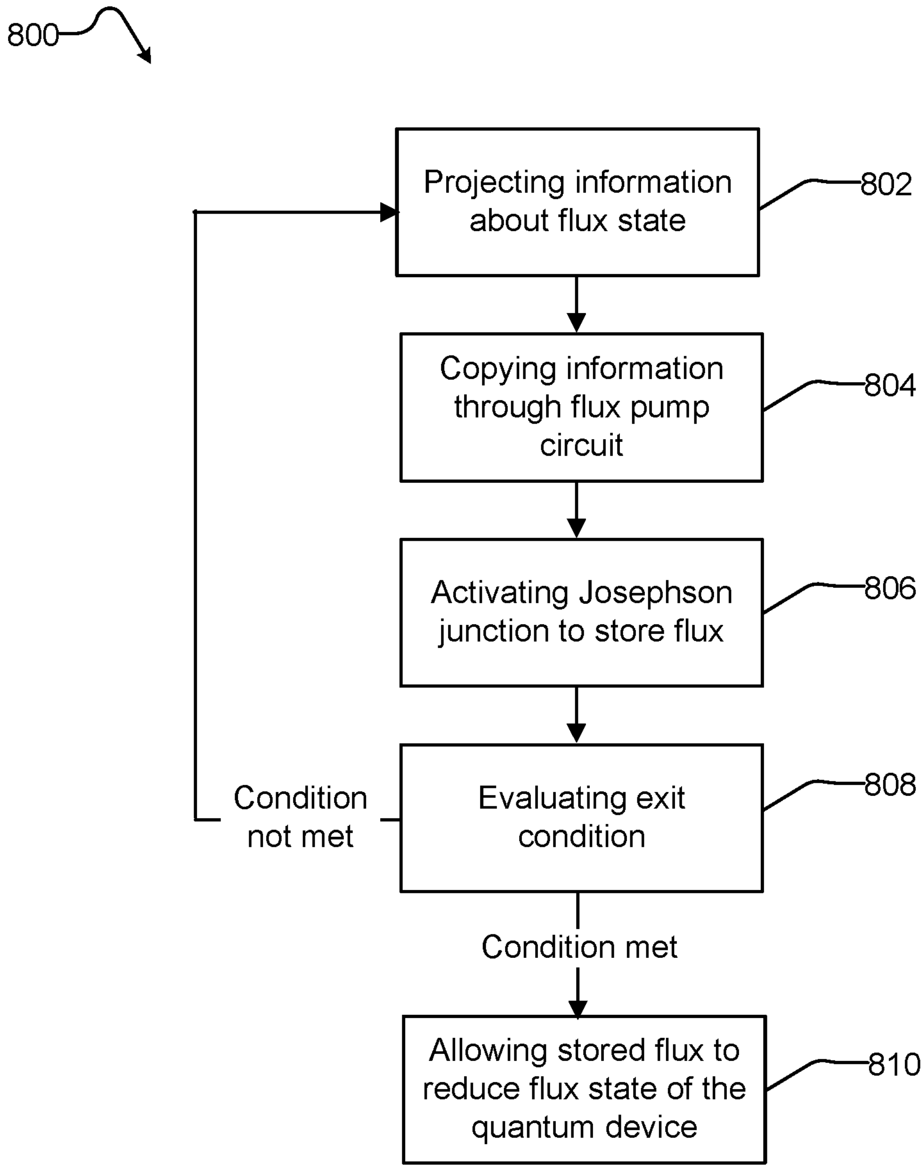
FIG. 8 is a flow chart of a method of compensating flux noise that can be employed in accordance with the present systems, devices, and methods.

Various processor- or computer-readable and/or executable instructions, data structures, or other data may be stored in system memory 122. For example, system memory 122 may store instructions for communicating with remote clients and scheduling use of resources including resources on the digital computer 102 and analog computer 104. Also, for example, system memory 122 may store at least one of processor executable instructions or data that, when executed by at least one processor, causes the at least one processor to execute the various algorithms to execute instructions. In some implementations system memory 122 may store processor- or computer-readable calculation instructions and/or data to perform pre-processing, co-processing, and post-processing to analog computer 104. System memory 122 may store a set of analog computer interface instructions to interact with analog computer 104. For example, the system memory 122 may store processor— or computer-readable instructions, data structures, or other data which, when executed by a processor or computer causes the processor(s) or computer(s) to execute one, more or all of the acts of method 800 (FIG. 8).

Analog computer 104 may include at least one analog processor such as quantum processor 126. Analog computer 104 may be provided in an isolated environment, for example, in an isolated environment that shields the internal elements of the analog computer from heat, magnetic field, and other external noise. The isolated environment may include a refrigerator, for instance a dilution refrigerator, operable to cryogenically cool the analog processor, for example to temperature below approximately 1 K.

Analog computer 104 may be a quantum processor and may include programmable elements such as qubits, couplers, and other devices (also referred to herein as controllable devices). Qubits may be read out via a readout control system 128. Readout results may be sent to other computer- or processor-readable instructions of digital computer 102. Qubits may be controlled via a qubit control system 130. Qubit control system 130 may include on-chip Digital to Analog Converters (DACs) and analog lines that are operable to apply a bias to a target device. Couplers that couple qubits may be controlled via a coupler control system 132. Coupler control system 132 may include tuning elements such as on-chip DACs and analog lines. Qubit control system 130 and coupler control system 132 may be used to implement a quantum annealing schedule as described herein on analog computer 104. Programmable elements may be included in quantum processor 126 in the form of an integrated circuit. Qubits and couplers may be positioned in layers of the integrated circuit that comprise a first material. Other devices, such as those of readout control system 128, may be positioned in other layers of the integrated circuit that comprise a second material. In accordance with the present disclosure, a quantum processor, such as quantum processor 126, may be designed to perform quantum annealing and/or adiabatic quantum computation. Examples of quantum processors are described in U.S. Pat. No. 7,533,068.

Quantum processors may perform two general types of quantum computation. The first, quantum annealing and/or adiabatic quantum computation, generally relies on the physical evolution of a quantum system. Gate, or circuit, model quantum computation relies on the use of quantum gate operations to perform computations with data. Surface code refers to a particular implementation of error-corrected gate or circuit quantum computation (QC), wherein logical qubits are encoded into portions or patches of a square lattice of physical qubits using a two-dimensional low density parity check scheme. Other implementations of gate model quantum computation are known in the art.

Example Superconducting Quantum Processor

Figure 2:
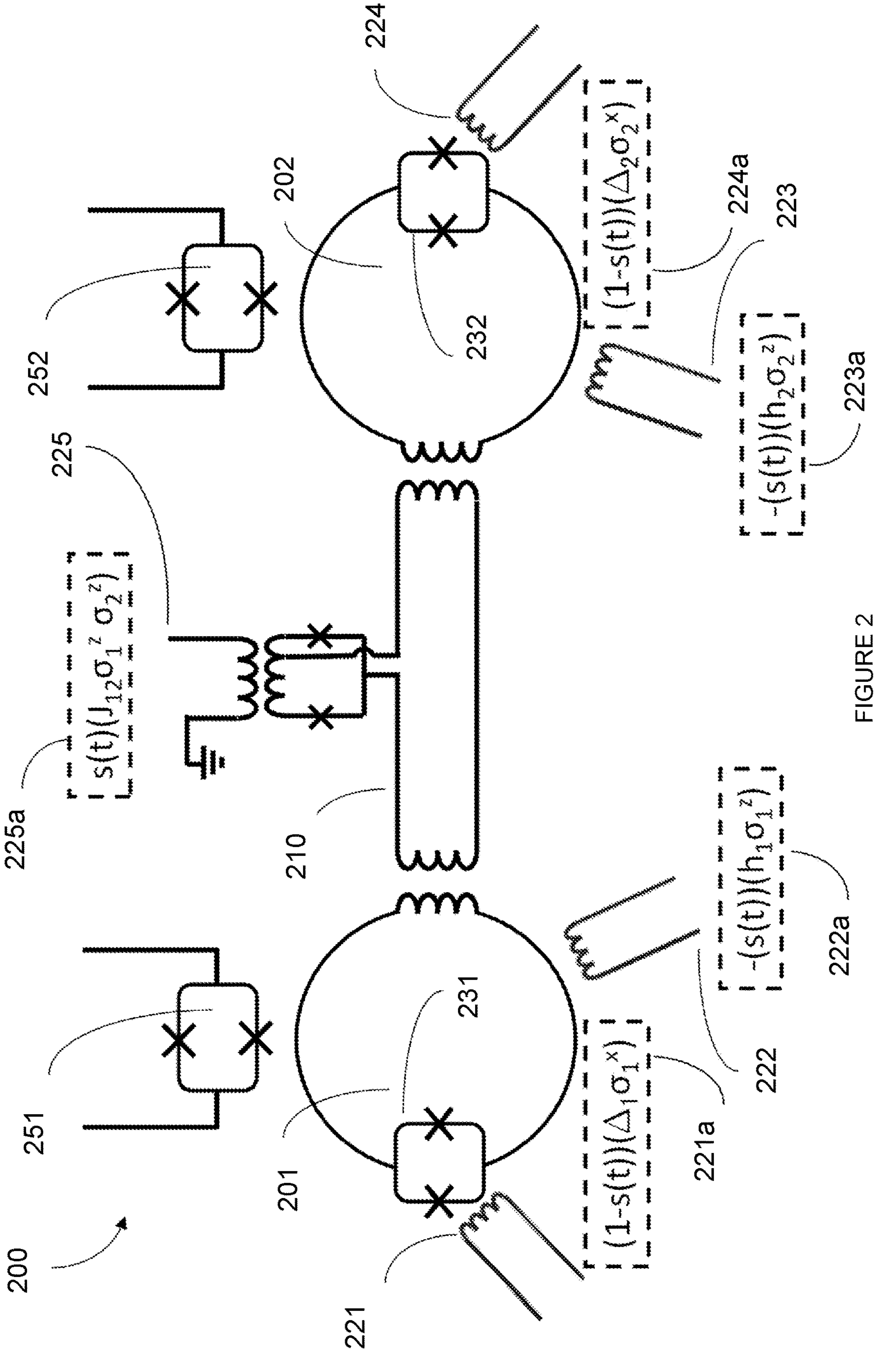
FIG. 2 is a schematic diagram of a portion of an example superconducting quantum processor that can be employed in accordance with the present systems, devices, and methods.

FIG. 2 is a schematic diagram of a portion of an example of a superconducting quantum processor 200, according to at least one implementation. The portion of superconducting quantum processor 200 shown in FIG. 2 includes two superconducting qubits 201 and 202. Also shown is tunable coupling via a coupler 210 between qubits 201 and 202 (i.e., providing 2-local interaction). While the portion of quantum processor 200 shown in FIG. 2 includes only two qubits 201, 202 and one coupler 210, those of skill in the art will appreciate that quantum processor 200 may include any number of qubits and any number of couplers coupling information between them.

Quantum processor 200 includes a plurality of interfaces 221, 222, 223, 224, 225 that are used to configure and control the state of quantum processor 200. Each of interfaces 221-225 may be realized by a respective inductive coupling structure, as illustrated, as part of a programming subsystem and/or an evolution subsystem. Alternatively, or in addition, interfaces 221-225 may be realized by a galvanic coupling structure. In some implementations, one or more of interfaces 221-225 may be driven by one or more DACs. Such a programming subsystem and/or evolution subsystem may be separate from quantum processor 200, or may be included locally (i.e., on-chip with quantum processor 200).

In the operation of quantum processor 200, interfaces 221 and 224 may each be used to couple a flux signal into a respective compound Josephson junction 231 and 232 of qubits 201 and 202, thereby realizing a tunable tunneling term (the A¿ term) in the system Hamiltonian. This coupling provides the off-diagonal σx terms of the Hamiltonian and these flux signals are examples of "delocalization signals". Examples of Hamiltonians (and their terms) used in quantum computing are described in greater detail in, for example, U.S. Pat. No. 9,424,526.

Similarly, interfaces 222 and 223 may each be used to apply a flux signal into a respective qubit loop of qubits 201 and 202, thereby realizing the hi terms (dimensionless local fields for the qubits) in the system Hamiltonian. This coupling provides the diagonal σz terms in the system Hamiltonian. Furthermore, interface 225 may be used to couple a flux signal into coupler 210, thereby realizing the Jij term(s) (dimensionless local fields for the couplers) in the system Hamiltonian. This coupling provides the diagonal of σz terms in the system Hamiltonian.

In FIG. 2, the contribution of each of interfaces 221-225 to the system Hamiltonian is indicated in broken line boxes 221*a*, 222*a*, 223*a*, 224*a*, 225*a*, respectively. As shown, in the example of FIG. 2, the broken line boxes 221*a*-225*a* are elements of time-varying Hamiltonians for quantum annealing and/or adiabatic quantum computing.

While quantum processor 200 is an example of a quantum annealing processor, it will be understood that the methods described herein may also be applied to other types of quantum processors, such as gate or circuit model quantum processors. Throughout this specification and the appended claims, the term "quantum processor" is used to generally describe a collection of physical qubits (e.g., qubits 201 and 202) and qubit couplers (e.g., coupler 210). Physical qubits 201 and 202 and coupler 210 are referred to as the "controllable devices" of quantum processor 200 and their corresponding parameters (e.g., the qubit h¿ values and the coupler Jij values) are referred to as the "controllable parameters" of the quantum processor. In the context of a quantum processor, the term "programming subsystem" is used to generally describe the interfaces (e.g., programming interfaces 222, 223, and 225) used to apply the controllable parameters to the controllable devices of quantum processor 200 and other associated control circuitry and/or instructions. In some implementations, programming interfaces 222, 223, and 225 may include DACs. DACs may also be considered programmable devices that are used to control controllable devices such as qubits, couplers, and parameter tuning devices.

As previously described, the programming interfaces of the programming subsystem may communicate with other subsystems which may be separate from the quantum processor or may be included locally on the processor. The programming subsystem may be configured to receive programming instructions in a machine language of the quantum processor and execute the programming instructions to program the programmable and controllable devices in accordance with the programming instructions. Similarly, in the context of a quantum processor, the term "evolution subsystem" generally includes the interfaces (e.g., "evolution interfaces" 221 and 224) used to evolve devices such as the qubits of quantum processor 200 and other associated control circuitry and/or instructions. For example, the evolution subsystem may include annealing signal lines and their corresponding interfaces 221, 224 to qubits 201, 202. Evolution may refer to performing quantum annealing, or to other types of quantum computations.

Quantum processor 200 also includes readout devices 251 and 252, where readout device 251 is associated with qubit 201 and readout device 252 is associated with qubit 202. In the example implementation shown in FIG. 2, each of readout devices 251 and 252 includes a direct current superconducting quantum interference device (DC-SQUID)

inductively coupled to the corresponding qubit. In the context of quantum processor 200, the term "readout subsystem" is used to generally describe the readout devices 251, 252 used to read out the final states of the qubits (e.g., qubits 201 and 202) in quantum processor 200 to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.), any of which may comprise DACs. Qubit readout may also be performed using alternative circuits, such as that described in U.S. Pat. No. 8,854,074.

While FIG. 2 illustrates only two physical qubits 201, 202, one coupler 210, and two readout devices 251, 252, a quantum processor (e.g., quantum processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit, the Josephson energy dominates or is equal to the charging energy. In a charge qubit this is reversed. Examples of flux qubits that may be used include radio frequency superconducting quantum interference devices (rf-SQUIDs), which include a superconducting loop interrupted by one Josephson junction, persistent current qubits, which include a superconducting loop interrupted by three Josephson junctions, and the like.

Figure 3:
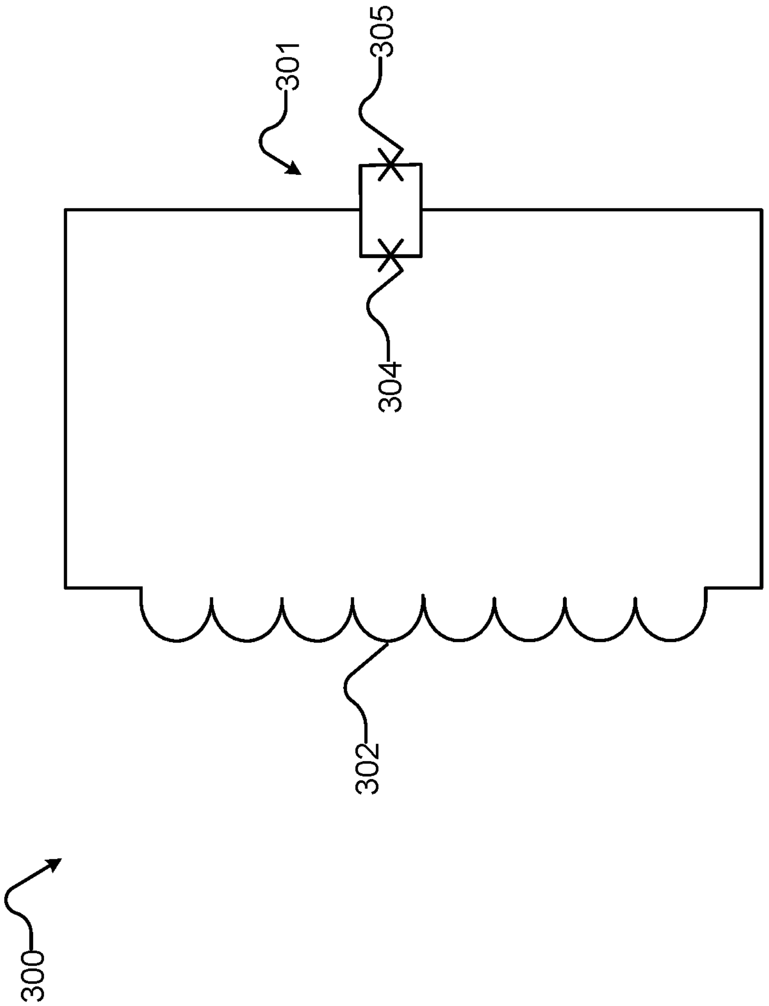
FIG. 3 is a schematic diagram of an example fluxonium qubit that can be employed in accordance with the present systems, devices, and methods.

FIG. 3 is a schematic diagram of an example implementation of a superconducting qubit 300. A fluxonium qubit is a flux qubit with a very large body inductance, $E_J/E_L>>1$ and $E_C/E_L>>1$. For a discussion of fluxonium qubits see Manucharyan, V. E., et al., 2009, Science 326 (5949), 113 and U.S. Provisional Patent Application No. 63/223,686. Superconducting qubit 300 is similar to a fluxonium qubit, and replaces the array of Josephson junctions of a fluxonium qubit with a kinetic inductor. Superconducting qubit 300 comprises a Josephson junction structure 301 and a kinetic inductor 302. In the present example implementation, Josephson junction structure 301 comprises two Josephson junctions 304 and 305 to form a compound Josephson junction (CJJ). A person skilled in the art will understand that Josephson junction structure 301 may include only one Josephson junction or include compound-compound Josephson junctions (CCJJ) where one or both of the parallel paths of a CJJ is itself a CJJ, and in certain implementations, Josephson junction structure 301 may include other structures, e.g., inductors electrically in series with Josephson junctions 304 and 305. Kinetic inductor 302 may comprise Niobium Nitride (NbN), Niobium Titanium Nitride (NbTiN) or Titanium nitride (TiN).

Kinetic Inductance

Current flowing through a metal material in principle stores energy both in the magnetic field of that metal and in the kinetic energy of the charge carriers (e.g., the electrons or Cooper pairs). In non-superconducting metals, the charge carriers collide frequently with the lattice and lose their kinetic energy as Joule heating. This is also referred to as scattering, and quickly releases energy. However, in superconducting materials, scattering is substantially reduced, as the charge carriers are Cooper pairs which are protected against dissipation through scattering. This allows for superconducting materials to store energy in the form of kinetic inductance. This phenomenon allows kinetic inductance to efficiently store energy within the superconducting metal. Kinetic inductance is at least in part determined by the inertial mass of the charge carriers of a given material and increases as carrier density decreases. As the carrier density decreases, a smaller number of carriers must have a proportionally greater velocity in order to produce the same current. Materials that have high kinetic inductance for a given area (as defined below) are referred to as "kinetic inductance materials", or "high kinetic inductance materials".

Kinetic inductance materials are those that have a high normal-state resistivity and/or a small superconducting energy gap, resulting in a larger kinetic inductance per unit of area. In general, total inductance L of a superconducting material is given by $L=L_K+L_G$, where $L_G$ is the geometric inductance and Lx is the kinetic inductance. The kinetic inductance of a superconducting film in near-zero temperatures is proportional to the effective penetration depth $\lambda_{eff}$. In particular, for a film with a given thickness t, the kinetic inductance of the film is proportional to the ratio of the length of the film L to the width of the film W, where length is in the direction of the current and width is orthogonal to length (note that both width and length are orthogonal to the dimension in which thickness is measured). That is, $$L_K \sim \lambda_{eff}\frac{L}{W}$$

for a superconaucung film with a given thickness. The kinetic inductance fraction of a material is characterized as $$\alpha = \frac{L_k}{L_g + L_k}.$$

A material considered to have high kinetic inductance would typically have a in the range of 0.1<a≤1. Materials with less than 10% of the energy stored as kinetic inductance would be considered traditional magnetic storage inductors with a small correction.

Flux Noise

A qubit (e.g., 201, 202, 300) is an example of a noise-susceptible device in a quantum processor. A coupler (e.g., 210) is another example. In the present specification, the phrase "noise-susceptible superconducting device" or "device having high susceptibility to noise" is used to describe a superconducting device that is susceptible to noise and for which a noise-free operating environment is highly desirable for performance of a superconducting integrated circuit, such as a quantum processor. Poor performance of a noise-susceptible device may result in the quantum processor producing an inaccurate or suboptimal solution to a problem, for example, an inaccurate or suboptimal result of quantum annealing or a gate model computation. Note that the phrases "noise-susceptible" and "susceptible to noise" do not necessarily suggest that the device itself is physically more or less sensitive to noise compared to other devices that are not described as noise-susceptible. Instead, "noise-susceptible" is used to refer to the sensitivity of processor performance to noise within a given device. The sensitivity of the processor performance to noise is higher in noise-susceptible devices than in devices that are described as less susceptible to noise or as "devices having low susceptibility to noise". Sources of noise in a quantum processor may, for example, include, but are not limited to, flux noise, charge noise, magnetic fields, and high frequency photons.

Low frequency flux noise is one example of noise that can cause problem misspecification in quantum processors and that may cause decoherence in qubits, both of which may result in quantum computation errors. Flux noise can degrade performance in both quantum annealing and gate model processors. Flux noise may originate within the materials that make up the superconducting circuits, for example, flux noise may be intrinsic-to-microscopic stoquastic fluctuations of magnetic defects in materials that make up a quantum processor. These fluctuations may be driven by thermal and quantum fluctuations, and some flux noise may be independent of actions taken with the quantum processor.

However, flux noise may also be impacted by actions taken with the quantum processor, such as performing operations involved in problem solving. For example, spin bath polarization resulting from quantum computations may manipulate the state of these magnetic defects and have an effect on subsequent operations of the quantum processor. While spin bath polarization in a quantum processor decays over time, a strong spin bath effect may provide flux noise that causes problem misspecification if it persists between quantum computations.

Fabrication techniques may beneficially be applied to provide circuits having lower inherent flux noise. In gate model processors, dynamical decoupling may be used, in which a pulse sequence reduces or reverses the impact of low frequency flux noise. In order to have a significant impact on low frequency flux noise, it may be beneficial to perform measurement and compensation on the time scale set by the spectrum of the low frequency flux noise fluctuations, which may be well under 1 second, to achieve significant improvement.

U.S. Pat. No. 10,552,755 describes one method of reducing flux noise by iteratively measuring qubit offsets and reprogramming qubit flux-bias DACs to compensate for the measured flux. This compensation method is limited by the repetition rate, as the flux offset changes over time, and significant processor time is required to readout the qubits and then reprogram the flux bias DACs. Occupying the quantum processor for performing this compensation reduces the time available for quantum computation, and therefore it is beneficial to reduce the time used in compensation. However, lower repetition rates provide poorer compensation of the flux noise due to the change in noise over time. As discussed in U.S. Pat. No. 10,552,755, on-chip flux noise has an inherent time correlation, and it is necessary to estimate the most probable flux offset in a given qubit at a given time based on the time elapsed since a measurement was taken. A model characterizing the relationship between the population of qubit states and the control parameter offset can be formed by a hyperbolic tangent function determined by a Boltzmann distribution, parameterized by a width related to the qubit energy scale and physical temperature. This solution requires intermittent measurement and projecting estimations of flux over time between measurements to apply to qubits during problem solving. Further, a static shim may only significantly reduce these offsets for a short time after compensation, as the flux noise occurs in a stoquastic manner.

Provided herein is an on-chip device for capturing qubit flux offset information and compensating for those offsets without bringing information off-chip or reprogramming the qubit flux-bias DACs. This may beneficially allow for faster and therefore more effective compensation of these flux biases. Providing an on-chip device beneficially allows for more frequent measurements, as performing readout to one or more devices in a room temperature environment is not required. In the circuit that will be described below, the direction of flux bias determines the direction of flux loading into a storage loop based on circuit parameters, and the loading is self-limiting in response to compensation of flux noise. A signal from a device located in an environment at room temperature to provide the direction of flux loading based on a readout to room temperature is not required.

Figure 4:
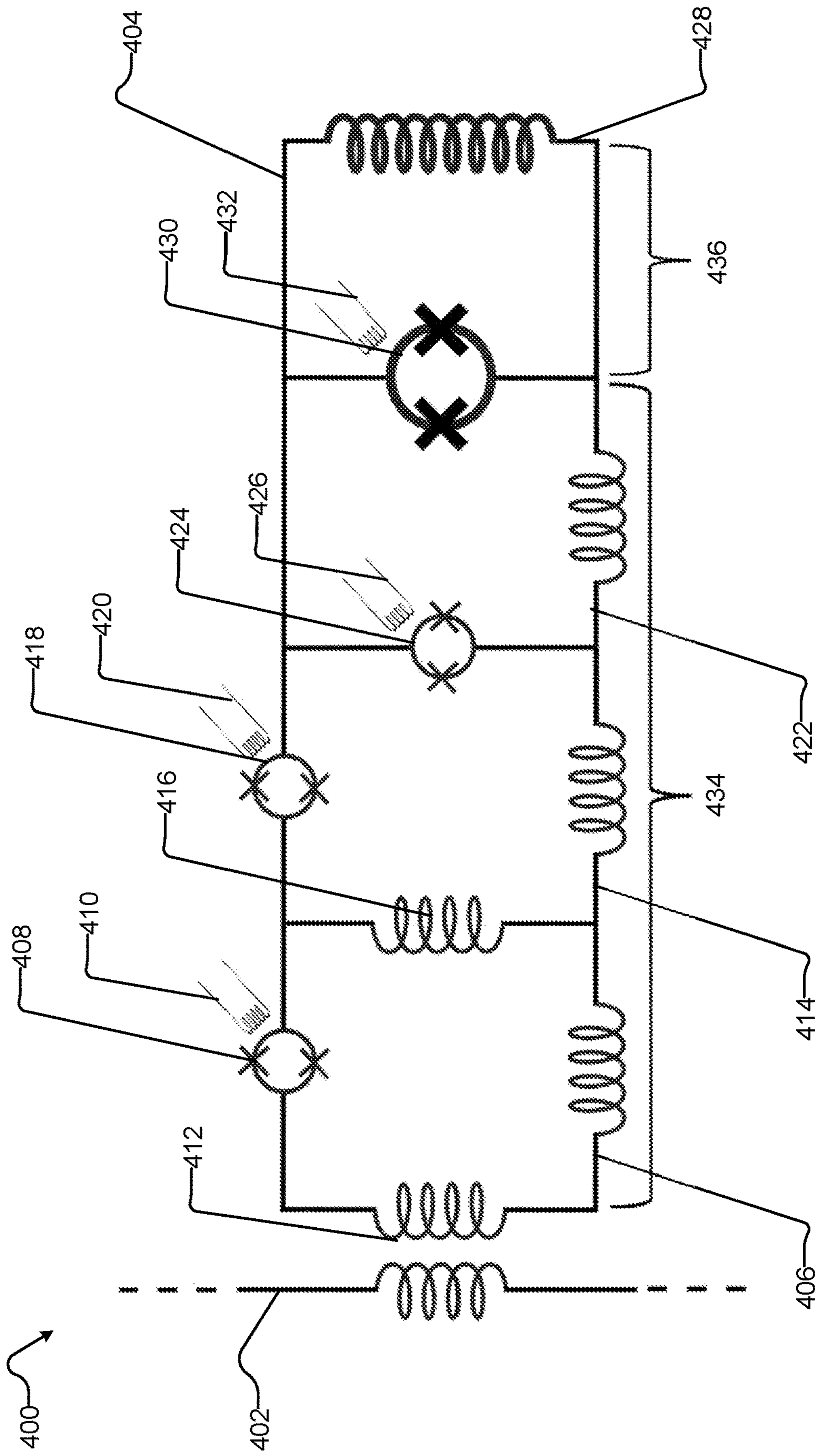
FIG. 4 is a schematic diagram of an example noise compensation circuit that can be employed in accordance with the present systems, devices, and methods.

FIG. 4 is an example implementation of a circuit 400 forming part of a quantum processor which may, for example, form part of analog computer 104 of FIG. 1 or quantum processor 200. Circuit 400 provides on-chip, per qubit, flux noise compensation. A portion of a qubit 402, which may be one of qubits 201, 202, 300 discussed with respect to FIGS. 2 and 3, or another type of flux qubit as are known in the art, is communicatively coupled with a flux compensation circuit 404. Portion of qubit 402 represents a length of the body of a qubit such as 201, 202, or 300, and has additional structures that are not shown such as Josephson junctions, interfaces with control devices, and interfaces with couplers. In the example implementation of FIG. 2, portion of qubit 402 may be a length of the body loop of qubit 201 that is not in communication with other devices such as coupler 210 or readout device 251. Flux compensation circuit 404 has a quantum flux parametron (QFP) flux pump circuit 434 and a storage circuit 436. QFP flux pump circuit 434 has a first QFP 406 communicatively coupled to qubit 402. In the example implementation of FIG. 4, first QFP 406 is inductively coupled to qubit 402 at an interface 412. In other implementations, coupling between first QFP 406 and qubit 402 may be galvanic, and first QFP 406 and qubit 402 may share an inductor, or coupling between first QFP 406 and qubit 402 may be a combination of partially galvanic and partially inductive. QFP devices may be used to copy qubit states for readout, as well as for copying states for programming and other applications. QFP devices such as QFP shift registers are described further in U.S. Pat. No. 10,528,886 and International (PCT) Patent Application Publication No. WO2022155140.

First QFP 406 has a first Josephson junction 408 in communication with a first control line 410. As used herein, "in communication" refers to electrical communication or coupling. In the example implementations of FIG. 4 and FIGS. 6A through 6K, "in communication" refers to inductive coupling. However, it will be understood that in other implementations, capacitive, galvanic, or other known communicative coupling types may be used. In the example implementation of FIG. 4, first Josephson junction 408 is a compound Josephson junction (CJJ), and may also be referred to as "first CJJ 408". In other implementations, first CJJ 408 may be a compound-compound Josephson junction (CCJJ). As used herein, compound-compound Josephson junction (CCJJ) refers to a Josephson junction where one or more of the junctions within a compound Josephson junction is itself a compound Josephson junction. It will be understood that all of the Josephson junctions discussed below may be single Josephson junctions, compound Josephson junctions, or compound-compound Josephson junctions.

In the example implementation of FIG. 4, first control line 410 is inductively coupled to first CJJ 408. QFP flux pump circuit 434 is electrically coupled in series with storage circuit 436, which has a second Josephson junction 430 and a storage loop 428. Second Josephson junction 430 may also be a CJJ or CCJJ, and may also be referred to as "second CJJ 430". The communication between QFP flux pump circuit 434 and storage loop 428 is mediated by second CJJ 430. A second control line 432 is in communication with second CJJ 430. As will be discussed in further detail below, storage loop 428 is communicatively coupled to qubit 402 such that, in use, flux stored in storage loop 428 acts on qubit 402 to counteract at least a portion of the flux noise acting on qubit 402. Storage loop 428 can back act through flux pump circuit 434, and the back acting current induced by the flux in storage loop 428 will be flowing in the opposite direction of the flux bias on the qubit due to flux noise. In this example implementation, storage loop 428 is communicatively coupled to qubit 402 through first QFP 406. However, in other implementations, storage loop 428 may be directly inductively coupled to qubit 402. In some implementations, storage loop 428 may be formed from a high kinetic inductance material. In some implementations, the entire length of storage loop 428 may be formed from high kinetic inductance material. In other implementations, only the inductor portion of storage loop 428 may be high kinetic inductor material. It will be understood that, while in the example implementation of FIG. 4, this inductor is depicted as a discrete structure, the inductor may also be a portion of storage loop 428 where coupling occurs, and may not be a discrete structure. In other implementations, storage circuit 436 may be entirely formed of high kinetic inductance material, including second CJJ 430.

In the example implementation of FIG. 4, a second QFP 414 is coupled to first QFP 406 electrically in series. Superconducting loops of first QFP 406 and second QFP 414 are electrically coupled by an inductor 416. It will be understood that, while in the example implementation of FIG. 4 inductors are depicted as discrete structures, the coupling may occur at a portion of the qubit or QFP body that is designated only by being the location where the coupling occurs, and may not be a distinct structure. Second QFP 414 has a third Josephson junction 418 (which may be a CJJ or CCJJ, and may also be referred to as "third CJJ 418") in communication with a third control line 420. A third QFP 422 is coupled to second QFP loop 414 in series. Superconducting loops of second QFP 414 and third QFP 422 are coupled by a fourth Josephson junction 424, which is in communication with a fourth control line 426, and may be a CJJ or CCJJ (and may also be referred to as "fourth CJJ 424)". Third QFP 422 is coupled to storage circuit 436 in series by second CJJ 430 in communication with second control line 432 as discussed above. While the example implementation of FIG. 4 has three QFPs (406, 414, 422) in series, it will be understood that the number of QFPs in QFP flux pump circuit 434 may be varied, as long as the relationship between the direction of the flux stored in storage loop 428 and the flux noise in qubit 402 is maintained. In addition, copying of a state from first QFP 406 into second QFP 414 as discussed in further detail below beneficially provides at least partial isolation between the rest of the circuit and qubit 402. Further, it allows a progression of circuit parameters that are favorable for operation of circuit 400.

Two implementations of example parameter values for circuit 400 are provided below. It will be understood that the provided parameter values are examples only, and other parameter values may be used depending on the requirements of the circuit. In the table below, the parameter values for the QFP Josephson junctions are represented as "2×" a numeric value, as the value given is for each junction of a two-junction compound Josephson junction (CJJ). The storage inductance value provided by storage loop 428 is significantly larger than the other inductance values in circuit 400. This larger storage inductance value may be provided by high kinetic inductance materials.

| Device | Example Implementation 1 | Example Implementation 2 |
|---|---|---|
| Qubit 402 | 150 pH | 150 pH |
| Qubit 402 to QFP 406 mutual inductance | 12 pH | 12 pH |
| QFP 406 inductance | 100 pH | 100 pH |
| CJJ 408 | 2 × 3.4 μA | 2 × 3.4 μA |
| Inductor 416 | 45 pH | 45 pH |
| QFP 414 inductance | 100 pH | 100 pH |
| CJJ 418 | 2 × 3.4 μA | 2 × 3.4 μA |
| CJJ 424 | 2 × 20 μA | 2 × 20 μA |
| QFP 422 inductance | 60 pH | 40 pH |
| CJJ 430 | 2 × 50 μA | 2 × 40 μA |
| Storage loop 428 inductor | 20 nH | 30 nH |
| QFP flux pump circuit 436 flux quanta storage | >100 flux quanta | >200 flux quanta |
| Feedback step size | 0.5 uPhi0 | 0.5 uPhi0 |

Figure 5:
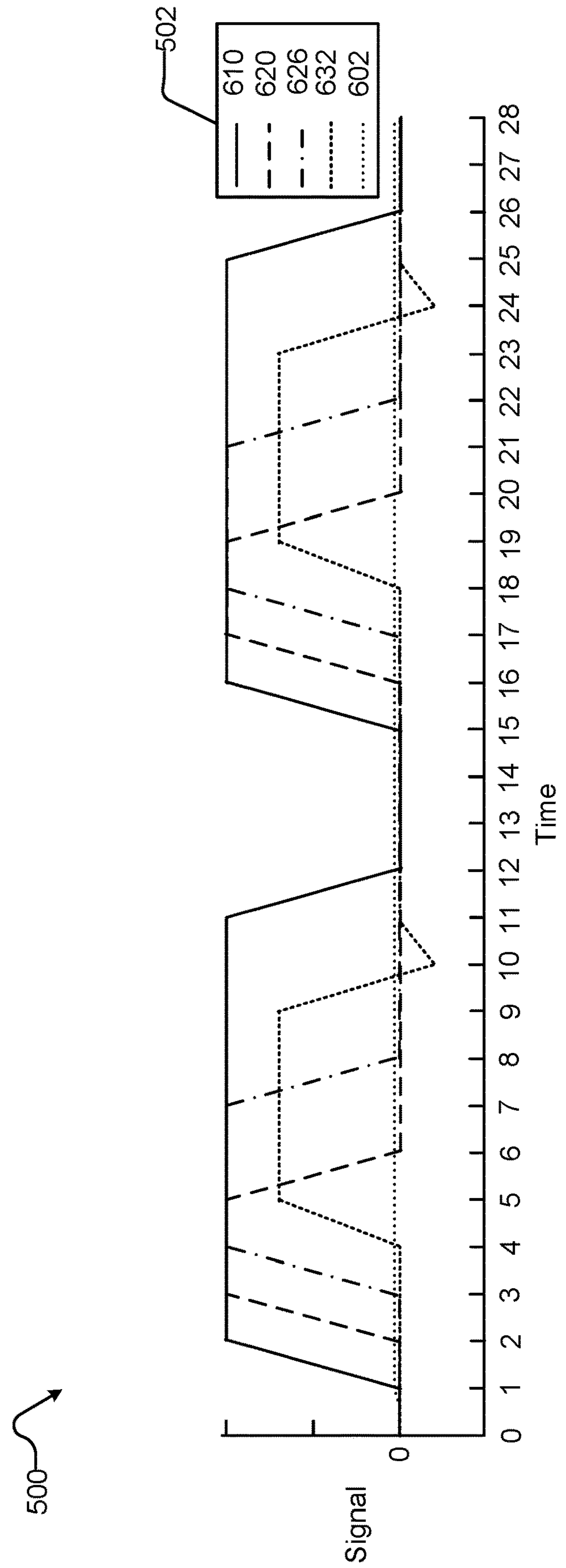
FIG. 5 is a graph of an example signal pattern for a noise compensation circuit that can be employed in accordance with the present systems, devices, and methods.

FIG. 5 provides an example time series plot 500 of signals that may be applied to circuit 600, as discussed below, in order to realize flux bias reduction in qubit 602. Signals may, for example, be applied to control lines similar to control lines 221 and 222 of FIG. 2, and may be provided by control systems similar to control systems 128, 130, 132 of FIG. 1. The signal shown provides a relative amplitude and is unitless in this example, but may, for example, be provided by relative flux quanta. A legend 502 provides a correspondence between the signals and the control lines and qubit shown in FIGS. 6A through 6K (i.e., control lines 610, 620, 626, 632, qubit 602). Time is shown in integer increments. It will be understood that this may relate to a time value, e.g., a number of nanoseconds, or the time steps may not be an integer value of time, but rather some preferred time interval. The increments provided are also examples, and the spacing between signal changes may not be spaced as shown. The sequence of signals will be described in further detail below with reference to FIGS. 6A through 6K.

Figure 6A:
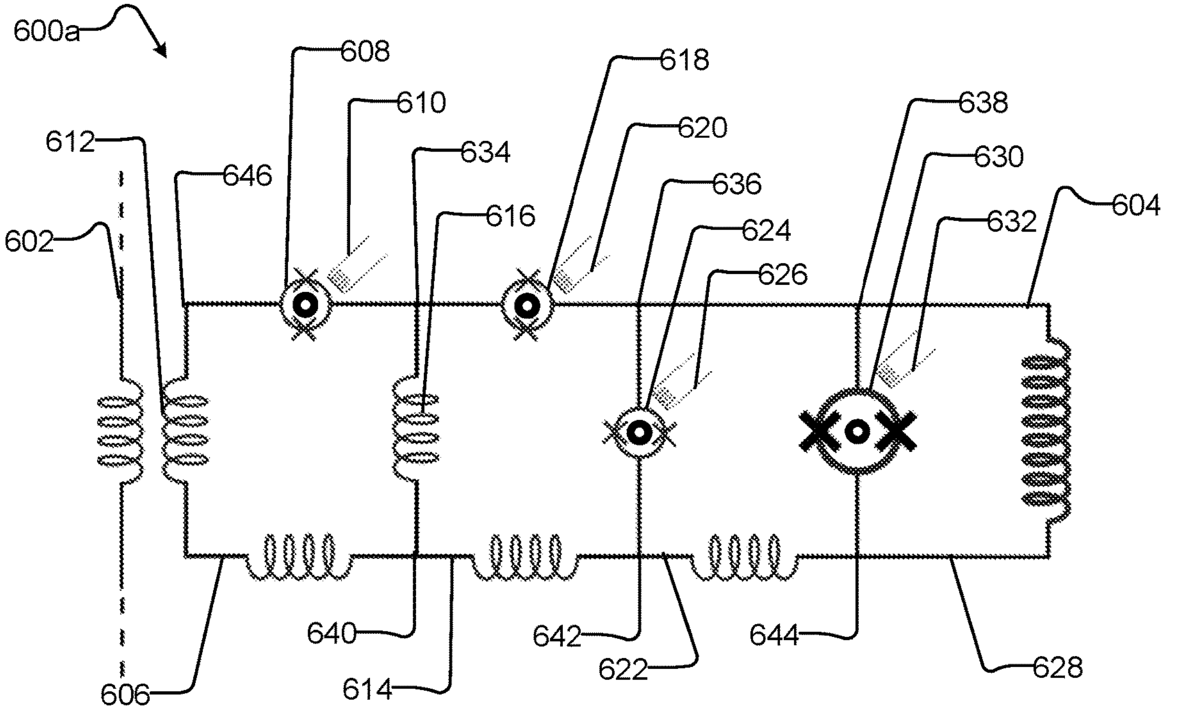
FIGS. 6A through 6K are schematic diagrams of an example noise compensation circuit at successive stages in a noise compensation cycle that can be employed in accordance with the present systems, devices, and methods.

FIG. 6A shows circuit **600*a* at time t=0 of times series plot 500, with no signals applied. Circuit 600*a* has a portion of a qubit 602 coupled to a flux compensation circuit 604. In FIGS. 6A through 6K discussed below, open circles are provided on CJJs that are inactive, while filled circles are provided on CJJs that have been activated by their respective signal line. Throughout FIGS. 6A through 6K, similar reference numbers to those used in FIG. 4 are used for similar components (e.g., qubits 402 and 602), and similar values to those provided in Example Implementations 1 and 2 discussed above may be applied to the elements of FIGS. 6A through 6K. At t=0 no signals are applied through qubit 602 or control lines (610, 620, 626, 632), and all CJJs (608, 618, 624, 630) are low. The values at nodes (634, 636, 638, 640, 642, 644, 646) are also zero. In the discussion below, units for values at nodes (634, 636, 638, 640, 642, 644, 646**) will be given in flux quanta. These numbers represent the phase at different points in the circuit in the example implementations discussed, and can be multiplied by 2π to convert to phase units. For example, if the difference in value between two nodes is 0.5, this implies a π phase difference between those nodes.

Figure 6B:
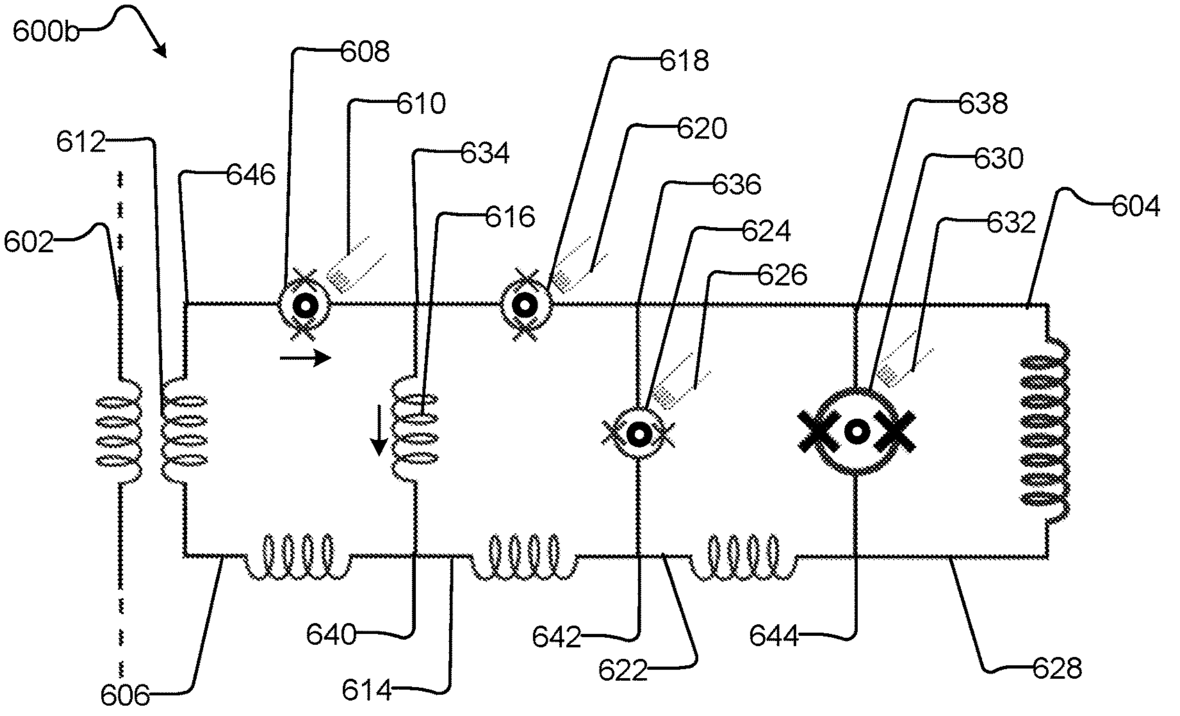

FIG. 6B shows circuit **600*b* at time t=1 when a signal is provided by qubit 602. Qubit 602 is annealed in the presence of flux noise so that the state of the qubit after the anneal will statistically be determined by the flux noise. The resulting qubit state, which can be represented by labels such as "spin up" or "spin down" or "0" or "1", provides information about the direction of the flux noise. For example, in the presence of flux noise that biases the qubit to a "spin up" state, the qubit will more often be found in that "spin up" state when annealed, and therefore the state of the qubit provides information (i.e., one bit of information) about the current flux noise. In order to counter the effects of this flux noise, flux will be loaded into the storage loop to act back on the qubit in order to reduce that bias. Qubit 602 is inductively coupled through an interface 612 to a first QFP 606. The current in qubit 602 induces a bias within first QFP 606. FIG. 6B shows arrows indicating the direction of this induced current. It will be understood that the direction of these arrows would be reversed where the state of qubit 602 was the opposite. In Example Implementation 1 outlined above, where a 10 mPhiO bias is applied by qubit 602, the induced current through a first CJJ 608 and an inductance 616 is 0.1 uA, and the relative flux quanta at nodes 634, 636, and 638 is 0.01, while the relative flux quanta at nodes 640, 642, 644, and 646 is 0.0. The flux quanta at node 646** stays at zero throughout the process described below and will not be called out in each example.

Figure 6C:
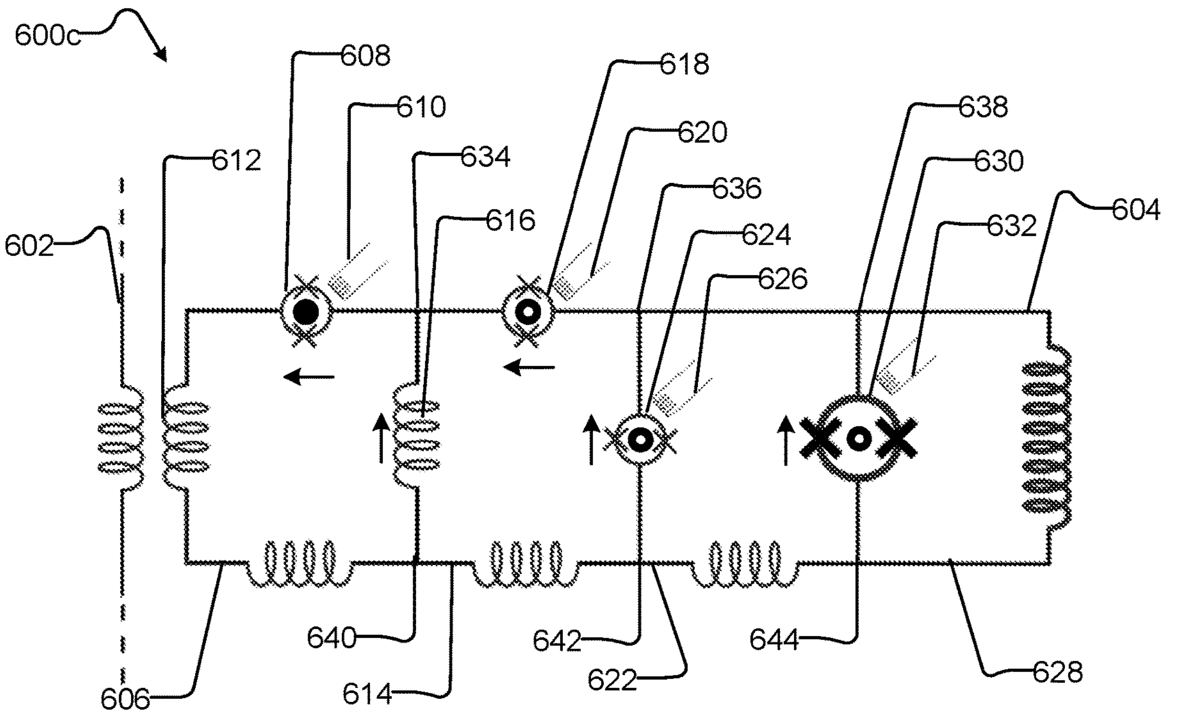

FIG. 6C shows circuit 600*c* at time t=2, when a signal is applied through signal line 610 in communication with first CJJ 608, bringing CJJ 608 high (to one flux quanta). This latches first QFP 606, causing first QFP 606 to enter a circulating current state. This reverses the direction of the current in first QFP 606, and generates current in a second QFP 614. While the signal from qubit 602 may be small, this act of coupling amplifies the current. In Example Implementation 1, the current through first CJJ 608 becomes 5.3 uA, with the current through inductance 616 becoming 4.1 μA. Current through a second CJJ 618 becomes 1.2 μA, current through a third CJJ 624 becomes 1.0 μA, and current through a fourth CJJ 630 becomes 0.2 μA. Measurements of the relative flux quanta at each of nodes 634, 636, 638, 640, 642, and 644 are −0.3.

In Example Implementation 1, in addition to first QFP 606, flux compensation circuit 604 also has second QFP 614 and a third QFP 622 coupled in series. As discussed above, the coupled signal from qubit 602 into first QFP 606 generates current in second QFP 614.

Providing a QFP flux pump circuit having multiple QFPs coupled in series beneficially amplifies the signal from qubit 602. While it would be desirable to eliminate the flux offset in first QFP 606 such that the process starts from zero flux bias in all the components of flux compensation circuit 604, in practical implementations there may be some non-zero offset from stray magnetic fields, junction asymmetry, and other similar factors. The copying of the state into each successive QFP loop will be more robust due to the amplification. The state copied into each QFP will oppose the direction of current through the CJJ before the QFP is latched. The odd number of QFP loops result in the final state copied into the storage loop being in the reverse direction to the qubit, such that the flux back acting through the QFP circuit or direct coupling between the storage loop and the qubit mitigate at least a portion of the flux bias on the qubit. Prior to latching a CJJ, the energetically favorable state, that is, the lowest energy state, is where the phase difference across the junction is zero. Once the junction is latched, the energetically favorable state is where the phase difference is T. By moving the directional current through the QFP flux pump circuit, a phase difference is built up and eventually stored in the storage inductance in such a way that it back acts on the qubit to cancel out at least a portion of the flux noise.

In the example implementation of FIG. 4 and FIGS. 6A-K, where the communication between the storage loop and the qubit is mediated by the QFP stages, the number of QFP stages will be set by the current direction relationship. In this case, more QFP stages could be added, however, an odd number of QFP stages would need to be maintained, resulting in a requirement to add two stages at a time. That is, one aspect of designing the number of QFP loops and the coupling configuration would be the requirement that the net backaction from flux stored in the storage loop cancels rather than adding to the flux in the qubit. The feedback needs to have the opposite sign or be in the opposite direction to the noise. The direction of the backaction will be determined by the number of copy operations and the configuration of the QFP loops. In some implementations, where direct coupling is provided from the storage loop to the qubit rather than using backaction through the QFP stages, different numbers of QFPs may be included, and the sign relationship may be set based on the coupling to the qubit.

Figure 6D:
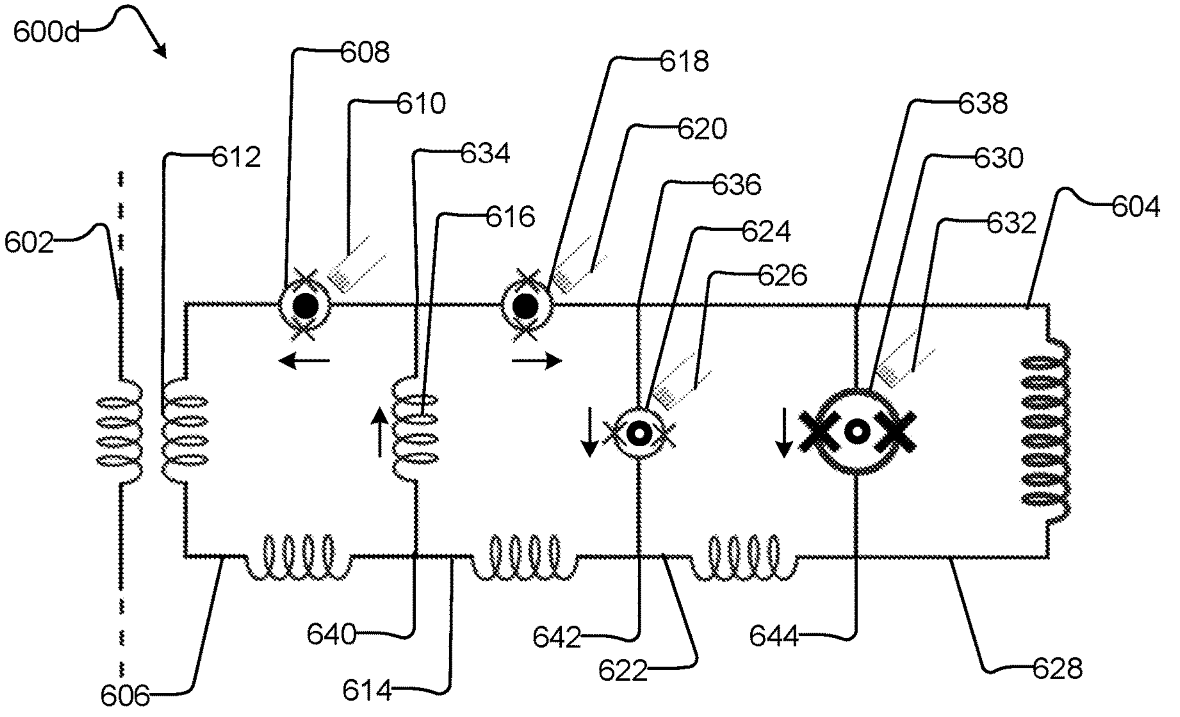

FIG. 6D shows circuit 600*d* at time t=3, when a signal is applied to control line 620 to cause CJJ 618 to become high and to latch second QFP 614 into the circulating current state, copying the state from first QFP 606. This causes a reverse in direction of the current within second QFP 614 due to the sign of the coupling between the two QFPs (first QFP 606 and second QFP 614). In Example Implementation 1, the current through first CJJ 608 becomes 4.2 μA, the current through inductance 616 becomes 8.2 μA, the current through second CJJ 618 becomes 4.1 μA, the current through third CJJ 624 becomes 3.5 μA, and the current through fourth CJJ 630 becomes 0.6 μA. Measurements taken at nodes, in flux quanta, are: −0.4 at node 634, −0.2 at node 640, and 0.0 at the remaining nodes (636, 638, 642, 644, 646). The difference in flux between node 634 and node 640 provides a phase difference across inductance 616.

Figure 6E:
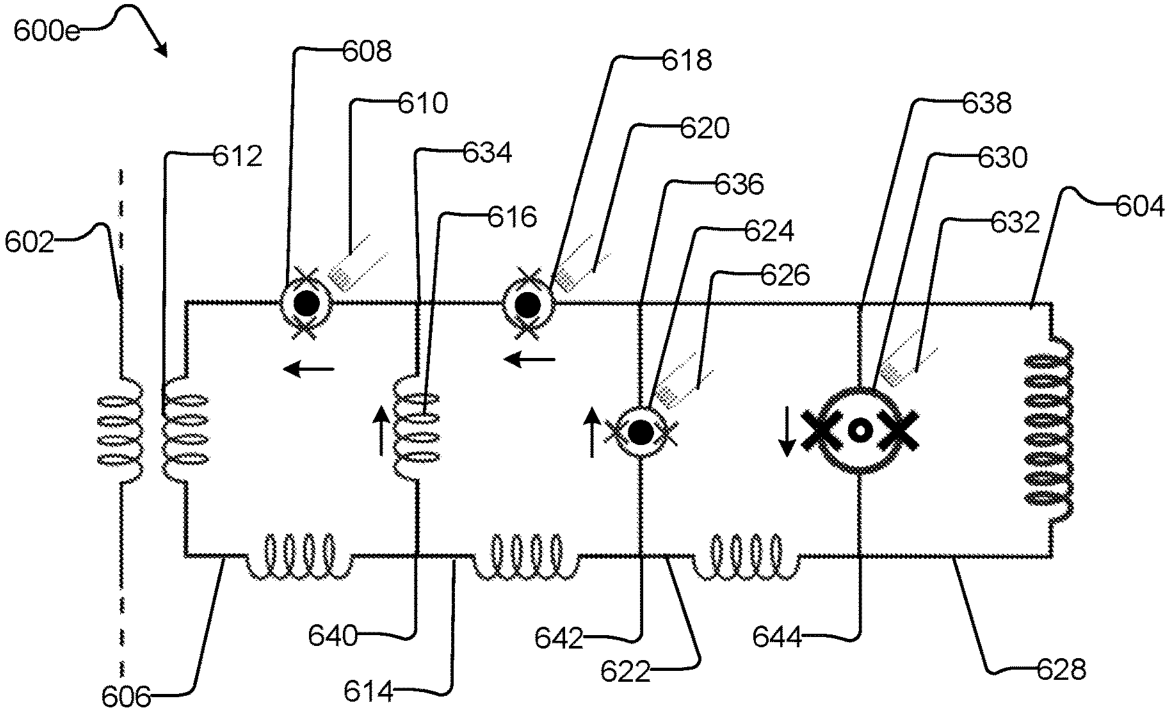

FIG. 6E shows circuit 600*e* at time t=4, when a signal is applied to control line 626 to cause third CJJ 624 to become high and to latch third QFP 622 into the circulating current state, copying the state from second QFP 614. This causes a reverse in the direction of the current within third QFP 622 and a further amplification of current. Third QFP 622 is defined by CJJ 624, and also communicates with fourth CJJ 630 of a storage circuit 628. In Example Implementation 1, the current through first CJJ 608 becomes 5.1 μA, the current through inductance 616 becomes 4.7 μA, the current through second CJJ 618 becomes 0.4 μA, the current through third CJJ 624 becomes 14 μA, and the current through fourth CJJ 630 becomes 13.6 μA. Measurements taken at nodes, in flux quanta, are: −0.4 at node 634, 0.2 at node 636, 0.2 at node 638, −0.2 at node 640, −0.3 at node 642, and 0.1 at node 644. This provides a n phase difference across CJJ 624.

Figure 6F:
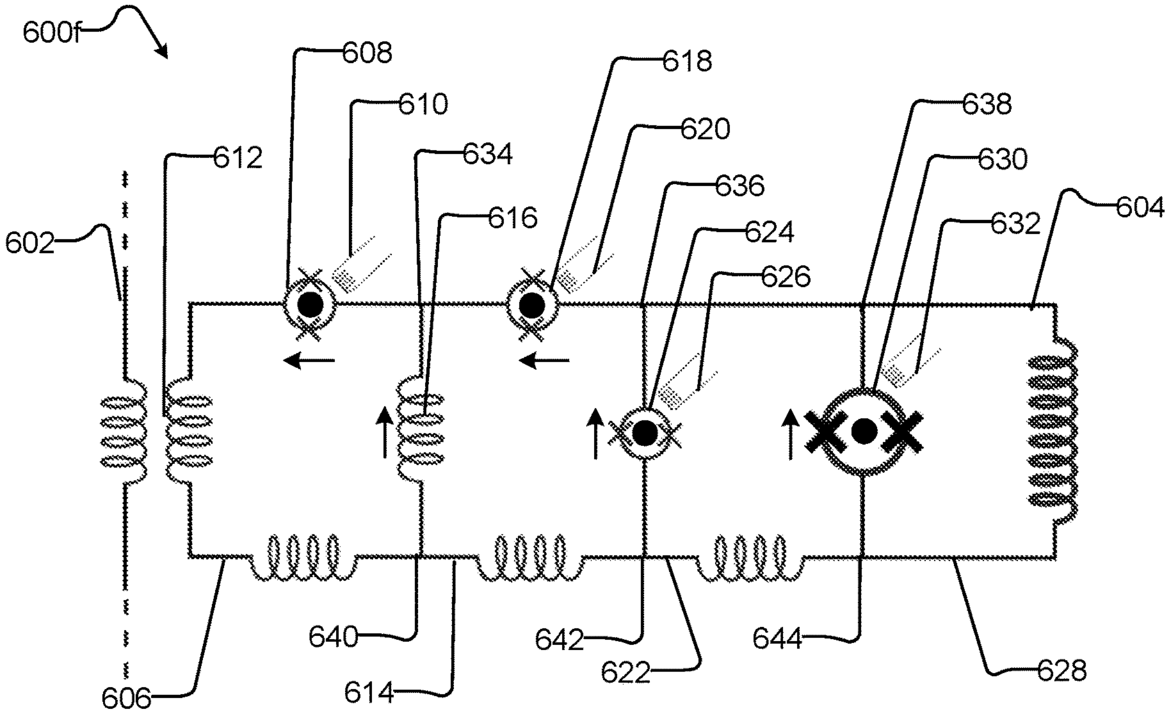

FIG. 6F shows circuit 600*f* at time t=5, when a signal is applied to control line 632 to cause fourth CJJ 630 to become high and to latch storage circuit 628 into the circulating current state, copying the state from third QFP 622. This again causes a reverse in the direction of the current within storage circuit 628. In Example Implementation 1, the current through first CJJ 608 becomes 5.3 μA, the current through inductance 616 becomes 4.1 μA, the current through second CJJ 618 becomes 1.2 μA, the current through third CJJ 624 becomes 1.2 μA, and the current through fourth CJJ 630 becomes 0.2 μA. Measurements taken at nodes, in flux quanta, are: −0.3 at node 634, 0.2 at node 636, 0.2 at node 638, −0.3 at node 640, −0.3 at node 642, and −0.3 at node 644. The difference in flux quanta between the top and the bottom of fourth CJJ 630 is 0.5 flux quanta, or, in phase units, this provides a π phase difference across fourth CJJ 630, and a flux quanta will be copied into the storage inductance of storage circuit 628.

Figure 6G:
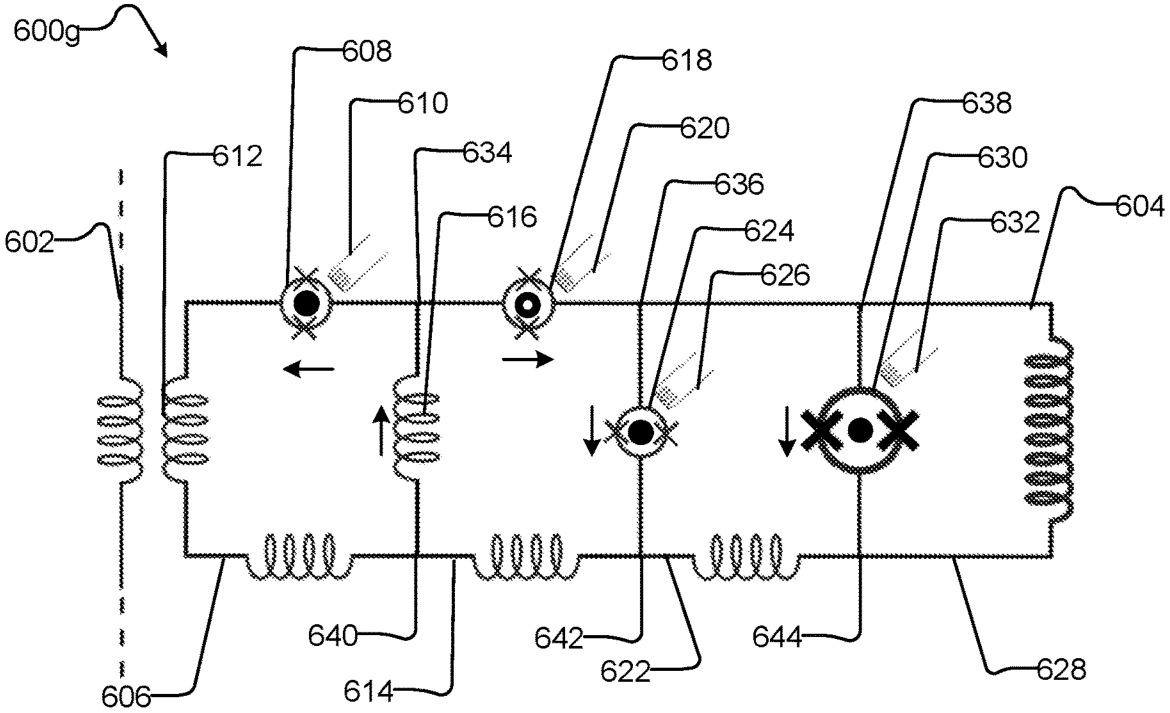

FIG. 6G shows circuit 600*g* at time t=6. The state of first QFP 606 is the same as it was at t=2, with the current in the opposite direction of the current induced by qubit 602. This can be used to provide additional flux quanta to storage circuit 628. Thus, by repeating a similar process, another flux quanta can be copied from first QFP 606. At t=6, the signal from control line 620 is removed, bringing second CJJ 618 low and reversing the direction of the current through second QFP 614. The removal of the latch bias both changes the current direction and increases the magnitude of the current. In Example Implementation 1, the current through first CJJ 608 becomes 4.2 μA, the current through inductance 616 becomes 8.2 μA, the current through second CJJ 618 becomes 4.1 μA, the current through third CJJ 624 becomes 3.5 μA, and the current through fourth CJJ 630 becomes 0.5 μA. Measurements taken at nodes, in flux quanta, are: −0.4 at node 634, 0.5 at node 636, 0.5 at node 638, −0.2 at node 640, 0.0 at node 642, and 0.0 at node 644.

Figure 6H:
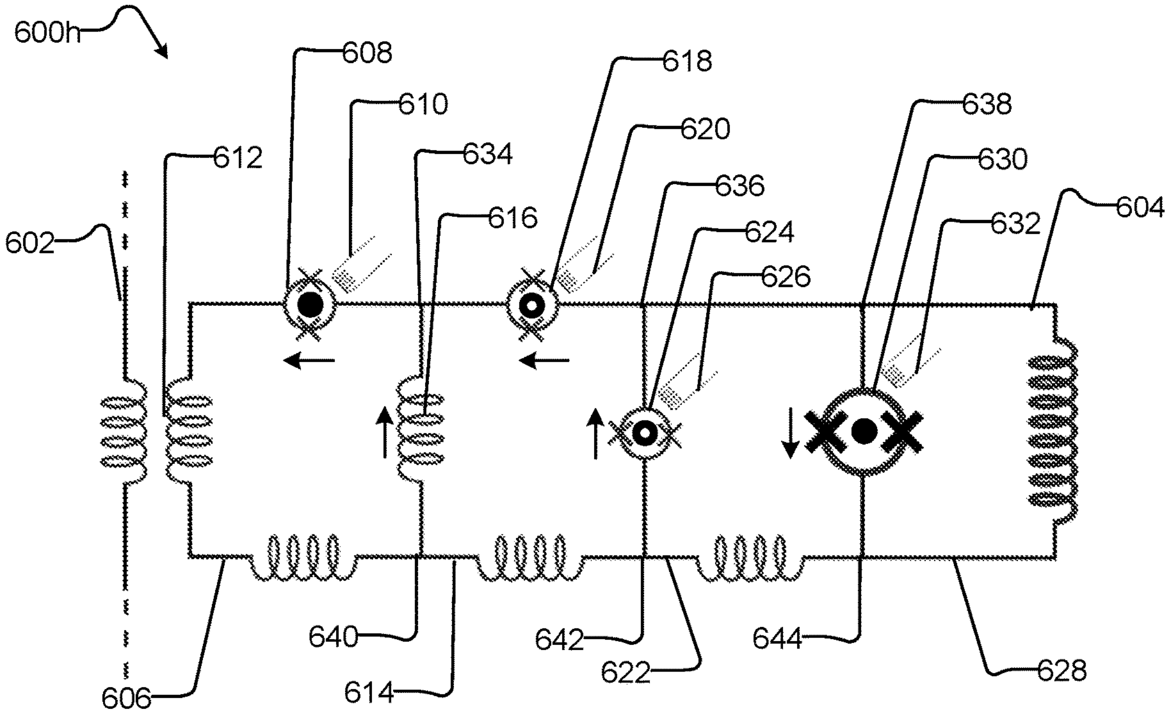

FIG. 6H shows circuit 600*h* at time t=8, where the latch is removed from third QFP 622 by removing the signal from third CJJ 624. Removing the latch from third QFP 622 increases the phase difference across fourth CJJ 630. In Example Implementation 1, the current through first CJJ 608 becomes 5.1 μA, the current through inductance 616 becomes 4.7 μA, the current through second CJJ 618 becomes 0.4 μA, the current through third CJJ 624 becomes 13.8 μA, and the current through fourth CJJ 630 becomes 13.3 μA. Measurements taken at nodes, in flux quanta, are: −0.3 at node 634, 0.7 at node 636, 0.7 at node 638, −0.2 at node 640, −0.3 at node 642, and 0.1 at node 644. The difference across fourth CJJ 630 in this example implementation has now increased from 0.5 to 0.6 flux quanta.

Figure 6I:
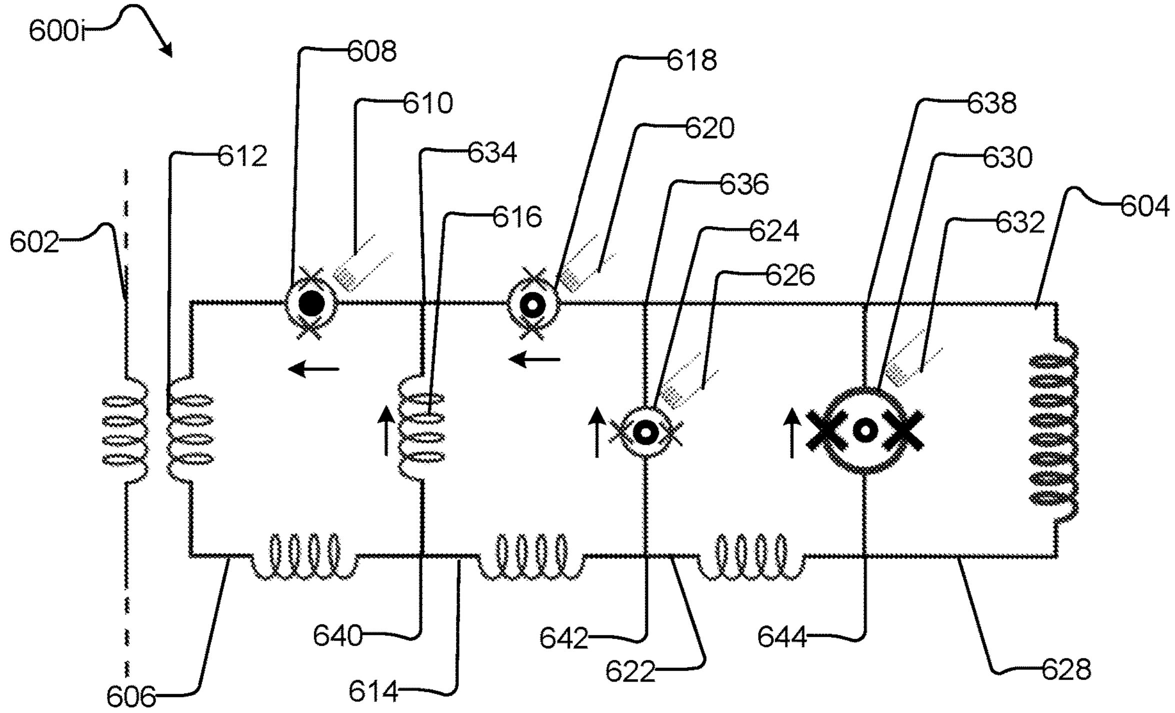

FIG. 6I shows circuit 600*i* at time t=11, where the signal to fourth CJJ 630 is lowered and the latch is removed from storage circuit 628. This increases the phase difference across fourth CJJ 630 relative to FIG. 6H. In Example Implementation 1, the current through first CJJ 608 becomes 5.3 μA, the current through inductance 616 becomes 4.1 μA, the current through second CJJ 618 becomes 1.2 μA, the current through third CJJ 624 becomes 1.0 A, and the current through fourth CJJ 630 becomes 0.3 μA. Measurements taken at nodes, in flux quanta, are: −0.3 at node 634, 0.7 at node 636, 0.7 at node 638, −0.3 at node 640, −0.3 at node 642, and −0.3 at node 644. The difference across fourth CJJ 630 in this example implementation has now increased from 0.6 to 1.0 flux quanta and flux is now stored in the storage inductance of storage circuit 628.

Figure 6J:
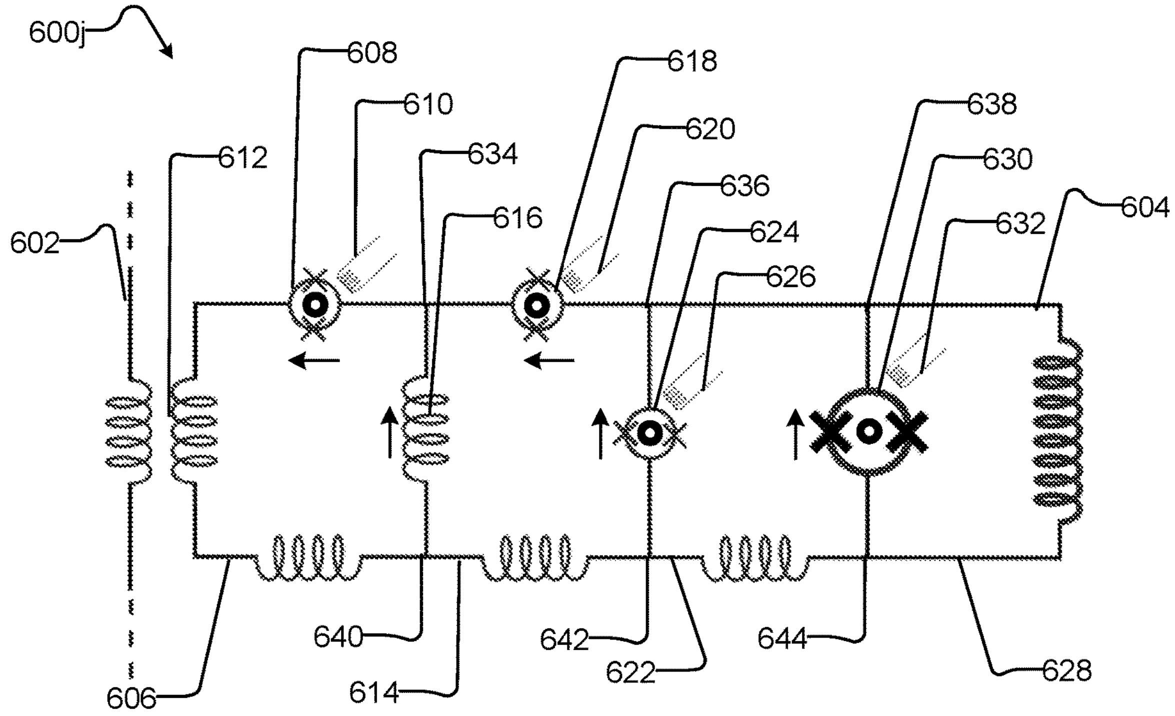

FIG. 6J shows circuit 600*j* at time t=14, where the feedback circuit has become quiescent. The signal to first CJJ 608 has been removed and the latch on first QFP 606 has been removed. In Example Implementation 1, the current through first CJJ 608 becomes 0.0 HA, the current through inductance 616 becomes 0.0 pA, the current through second CJJ 618 becomes 0.0 μA, the current through third CJJ 624 becomes 0.0 μA, and the current through fourth CJJ 630 becomes 0.1 μA. Measurements taken at nodes, in flux quanta, are: 0.0 at node 634, 1.0 at node 636, 1.0 at node 638, 0.0 at node 640, 0.0 at node 642, and 0.0 at node 644. One flux quanta is now stored in storage circuit 628.

High phase nodes 636 and 638 are effectively isolated from the rest of the circuit by either a CJJ or an inductance in each direction. This blocks the high phase node from the low phase side of the circuit. The current through an inductor is proportional to the phase difference and inversely proportional to the inductance. For a CJJ, the current is sinusoidal in phase, so for each integer multiple of 21, or 1 flux quanta, the phase difference across a CJJ will have no impact on current. That is, the periodicity of the junctions allows for the isolation of the high phase node. In the discussions above it is noted that different numbers of QFPs may be used. If third QFP 622, and in particular, third CJJ 624 were removed from circuit 600*a*-600*k*, the high phase node would still be isolated by second CJJ 618 and fourth CJJ 630.

Figure 6K:
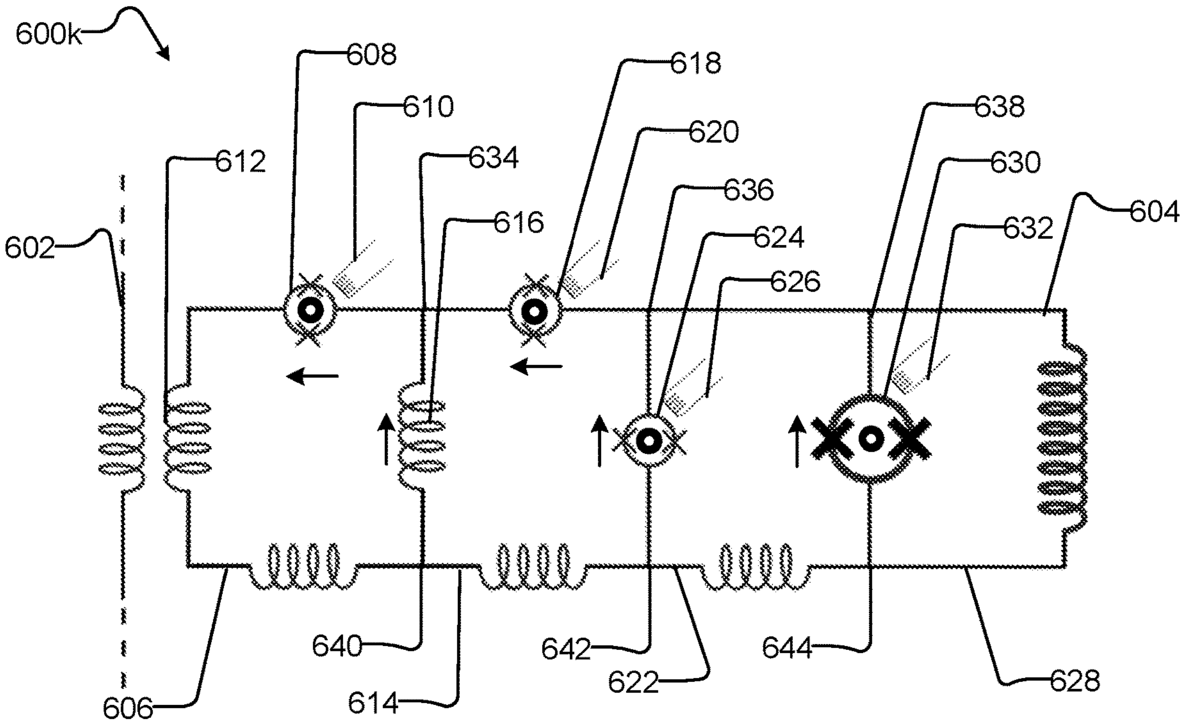

FIG. 6K shows circuit 600*k* at time t=28, where a second cycle, as described above, has been performed. In Example Implementation 1, this results in the flux quanta at node 636 and node 638 increasing to 2.0, and the current through fourth CJJ 630 increasing to 0.2, with flux quanta in the rest of circuit 600*k* remaining at 0.0. With flux stored in storage circuit (e.g., loop) 628, the CJJ biases of all of the loops of QFPs 606, 614, 622 can be zeroed, causing the loops of QFPs 606, 614, 622 to effectively act like couplers to couple the flux stored in the loop of storage circuit 628 back to qubit 602, but in the reverse direction of the original state of qubit 602. This backaction will result in cancellation of at least a portion of the flux noise acting on qubit 602.

Figure 7:
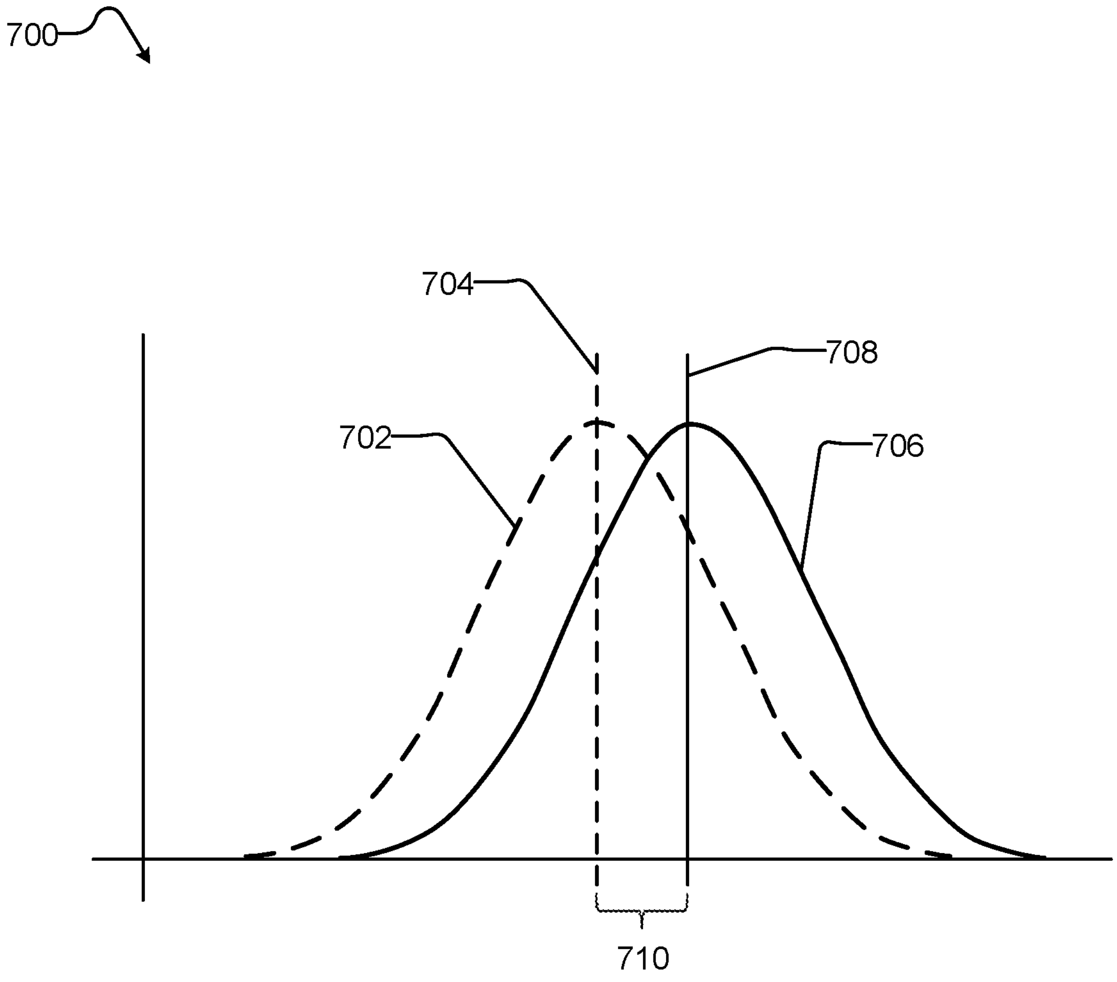
FIG. 7 is a graph of an example probability distribution for a qubit state that can be employed in accordance with the present systems, devices, and methods.

FIG. 7 shows an example probability distribution for a state of a qubit, such as qubit 402 or 602, after being read or detected. A graph 700 shows an ideal distribution 702 (in broken lines) for an ideal qubit experiencing no flux noise. Where a first state of a qubit is represented by the value "0" and the second state of a qubit is represented by the value "1", an ideal qubit will have an equal probability of being found in either state, and therefore the probability distribution will be centered around the value "0.5", as shown at 704. In other implementations, such as where the state of a qubit is represented by "−1" and "1", the distribution would be centered around "0" at 704. In the presence of flux noise, this probability distribution will shift, and the qubit will be more likely to be found in one state than the other. In the example implementation of FIG. 7, the qubit is biased to be more likely to be in the "1" state than the "0" state, (or the "1" state than the "−1" state) and the probability distribution 706 is centered around the value 708. This shift is represented by the distance 710.

In the example implementation of a quantum annealing processor, such as quantum processor 126 or circuit 200, qubits may be annealed to determine their state and provide this probability distribution. During a first anneal in the presence of the flux noise creating distance 710, the qubit is more likely to be found in the "1" state. The qubit in the "1" state will cause flux loading into the active noise compensation circuit (e.g., circuits 400 and 600*a* to 600*k*) as discussed above. During the next anneal of the qubit, the distribution will have shifted towards the ideal distribution due to the compensation from the active noise compensation circuit. However, the qubit is still likely to be found in the "1" state, and flux will be loaded in the same direction as after the first anneal, providing a larger compensation signal from the active noise compensation circuit, and shifting the distribution still closer to the ideal distribution. Over many anneals, the flux loaded into the active noise compensation circuit will bring the actual distribution of the qubit into alignment with the ideal distribution. At this stage, the qubit will be equally likely to be found in a "0" state or a "1" state, and no further flux will be added to the active noise compensation circuit. That is, it will be equally likely during each iteration that flux is added in a first direction or a second direction, resulting in a net zero change. As each cycle adds a positive or negative flux quanta, the feedback flux from the storage loop will fluctuate as the loading described is a stoquastic process. However, on average, if flux noise changes, the circuit will be loaded to reduce any imbalance in the population statistics of the qubit.

In order for the ambient flux noise to determine the direction of the current, the qubit must be isolated from sources of flux bias provided by the processor, allowing the flux noise to determine the state of the qubit. In the example implementation of a quantum annealing processor, the qubit can be annealed in nominally zero flux by deactivating control lines. The qubit annealing line can be activated for a given qubit, while the other qubits in the processor are held at a suppressed point. In other implementations, it may be sufficient for only neighboring qubits to be suppressed. In some implementations, annealing lines may be shared between qubits that are not neighboring. Qubits may be suppressed by applying an annealing wave form to one shared qubit annealing line at a time, while setting other shared annealing lines to their suppressed values. This will suppress neighboring qubits to each qubit being annealed. In this implementation, all qubits and flux compensation circuits associated with a given shared qubit annealing line may be operated simultaneously. The persistent current in the suppressed qubits will be zero, effectively decoupling the qubits. This also allows for couplers to not have to be reprogrammed, as they will not impact the qubit once it is decoupled.

FIG. 8 is a flow diagram of an example method 800 for compensating flux noise in a qubit, which can be employed in accordance with the present systems, devices, and methods. In at least some implementations, method 800 may be executed on a hybrid computing system comprising at least one digital or classical processor and at least one quantum processor, such as computing system 100 including digital processor 106 and quantum processor 126. The digital or classical processor may provide control signals or instructions to the quantum processor to execute the method.

Method 800 comprises acts 802 to 810; however, a person skilled in the art will understand that the number of acts illustrated is an example, and, in some implementations, certain acts may be omitted, further acts may be added, and/or the order of the acts may be changed.

At 802, information about a flux state of the qubit is projected into a quantum flux parametron (QFP) flux pump circuit. In some implementations, such as those using a quantum annealing processor, projecting information about the flux state of the qubit into a QFP flux pump circuit may involve annealing the qubit in the presence of ambient flux noise. For example, in a quantum processor having a plurality of qubits, information about a flux state of each qubit may be provided by annealing qubits through coupled CJJ control lines one at a time, such that when any given qubit is annealed, its neighboring qubits are suppressed. In addition, other sources of flux bias are deactivated such that it can be assumed that the flux in a given qubit is nominally zero aside from the flux noise to be compensated. Unlike when performing a computation with a quantum processor, it is beneficial to set up the environment so that each qubit is effectively isolated.

In some implementations, qubits may be subject to flux offsets during flux noise compensation (e.g., method 800) that differ in comparison with flux offsets during problem solving. For example, crosstalk may occur in a quantum processor, such as between qubit CJJ annealing lines (e.g., line 221 of FIG. 2) and qubit bodies. This crosstalk may provide a different flux offset during problem solving than during flux noise compensation, as some of the CJJ annealing lines will be suppressed during the flux noise compensation, as described above. Compensation devices may be coupled to ensure that flux noise compensation occurs for flux noise rather than a combination of flux noise and flux offsets in the processor, which may be achieved by providing the ability to zero qubit flux offset shifts present during flux noise compensation to ensure the flux compensation circuit (such as flux compensation circuits 404 and 604 discussed above) is operating on pure flux noise. Additional compensation devices may, for example, be provided on a per qubit basis to account for this flux offset. U.S. Pat. No. 9,015,215 describes examples of persistent current compensation devices that provide a per qubit programmable h-bias. Similar devices may be used to provide per-qubit flux offset compensation. For example, a similar compensation device may be provided for each qubit, and a global shared analog control line may be coupled to the compensation device. Each compensation device may be coupled to the qubit with per-qubit tunable coupling in order to provide per qubit flux offset compensation.

As discussed above with respect to FIG. 2, in a quantum annealing processor, bias lines are provided to generate h and/values for the quantum Hamiltonian. Referring to FIG. 2, in order to isolate a qubit, such as qubit 201, it is beneficial to zero the global waveform provided by the Hamiltonian and defined across the processor. The waveform that provides the h bias of the Hamiltonian is generated through one or more analog lines, and these lines can be turned off. For example, in FIG. 2, bias line 222 that provides the h bias can be turned off, as can bias line 223. This effectively isolates qubit 201 from qubit 202 (and any other qubits on the processor). Further, it means that couplers, such as coupler 210, do not need to be turned off or reprogrammed. That is, bias line 225 that provides the J values does not need to be varied. In some implementations, coupler CJJs may be biased by a combination of an analog control line and a coupler flux DAC. Reprogramming couplers may involve changing the state of the DAC. It may be beneficial to maintain both the state of the coupler DAC and the bias contribution provided by the coupler analog line. These contributions may shift qubit offsets, and it may therefore be beneficial to compensate qubit flux noise in the presence of these offsets, as they will be present during problem solving. In some implementations the analog control line may be shared between some or all of the couplers, and the bias required to suppress a coupler may vary for each coupler, requiring reprogramming of DACs. As discussed above, the methods described herein beneficially allow for flux noise compensation in individual qubits without reprogramming couplers. Annealing can then be done on a per qubit basis (or a per set of qubits basis where lines are shared as discussed above) using one qubit CJJ line, such as line 221 of FIG. 2, at a time.

In other implementations, the systems, methods, and devices described herein may be used for gate model quantum computing. In those implementations, the gate model qubits may be measured by a similar annealing process or by other compatible measurements. In an example implementation, projecting information about a flux state of a qubit into a QFP flux pump circuit may involve annealing the first QFP while it is in communication with the gate model qubit. Annealing the first QFP will cause it to reflect the state of the coupled qubit without annealing the qubit directly. The first QFP can be coupled such that it detects the flux state of the qubit and when annealed adopts a state that reflects that flux state of the qubit, thereby providing information about the flux bias on the qubit itself. In some examples, such as for gate model flux qubits, projecting information about the flux state of the qubit into a QFP flux pump circuit may involve annealing a first QFP in communication with the qubit in the presence of ambient flux noise. In some examples, this can include deactivating biasing devices in communication with the qubit to isolate the qubit prior to projecting information about the flux state of the qubit.

In some implementations, the flux compensation circuit described herein may also be coupled to a coupler, such as coupler 210 of FIG. 2, in order to compensate flux noise in the coupler. Couplers can also experience flux noise, and this can have an impact on the coupled qubits. In the systems, methods, and devices described herein, flux noise acting on the couplers, and therefore on the qubits, will be compensated by the flux compensation circuit coupled to the qubit, as the couplers are active during the compensation. However, flux noise in the couplers may also be compensated directly. Couplers may be annealed by an analog line coupled to the coupler Josephson junctions. In some systems, couplers may be designed with a CCJJ, and these couplers may be compensated directly by a flux compensation circuit. However, as discussed above, the impact on the qubits of coupler flux noise can be compensated through qubit flux compensation circuits.

At 804, the information about the flux state of the qubit is copied through the QFP flux pump circuit as a directional current. In some implementations, such as the example implementation of FIG. 4, copying the information about the flux state of the qubit through the QFP flux pump circuit as a directional current may include the acts outlined above with respect to FIGS. 6A through 6K. These acts may include inducing a current in a first QFP comprising a first Josephson junction based on the projected information about the flux state, activating the first Josephson junction to latch the first QFP, inducing a current in a second QFP comprising a second Josephson junction based on the current in the latched first QFP, and activating the second Josephson junction to latch the second QFP. These acts may further include inducing a current in a third QFP comprising a third Josephson junction based on the current in the latched second QFP and activating the third Josephson junction to latch the third QFP.

At 806, a Josephson junction coupled in series with the QFP flux pump circuit is activated to store flux in a storage loop connected to the Josephson junction based on the directional current.

At 808, the exit condition is evaluated. Where the exit condition is met, control passes to act 810. Where the exit condition is not met, control returns to act 802, and acts 802 through 808 are repeated iteratively until the exit condition is met. In some implementations, the exit condition can be a number of iterations of performing acts 802 through 808. In other implementations, the exit condition may be based on a measurement of flux noise in the qubit or may be based on the direction of the flux added to the QFP flux pump circuit at each stage. When the direction of the flux added has an approximately equal probability to be in one direction or the other, the qubit has likely been sufficiently compensated.

At 810, the flux stored in the storage loop communicates with the qubit to reduce the flux state of the qubit. As discussed above, in the example implementations of FIG. 4 and FIGS. 6A-K, the state stored in the storage loop can couple to the qubit through the quiescent QFP flux pump circuit to compensate flux noise acting on the qubit.

After 810, method 800 terminates, until it is, for example, invoked again.

In some implementations, such as where the quantum processor comprises a plurality of qubits, method 800 may be repeated successively for each qubit in a quantum processor to compensate flux noise across the quantum processor. In other implementations, such as where sets of qubits in different neighborhoods (that is, no two qubits in a set of qubits are connected by a coupler) share control lines, method 800 may be performed simultaneously for a first set of qubits, and then repeated successively for each set of qubits. All of the qubits within each set of qubits share an annealing control line (such as annealing line 221 of FIG. 2) and are in different neighborhoods. When method 800 is performed on one set of qubits, all other sets of qubits are suppressed, as discussed above. Once all of the qubits have been compensated, the processor may be used for problem solving. It may be beneficial to repeat the method for all qubits between each problem solved, or at set time intervals, in order to compensate for changes in the flux noise. Method 800 may be performed for each qubit annealing line in a quantum processor between each problem anneal. After each qubit has been compensated, the processor can be used to solve a quantum annealing problem. Performing flux noise compensation prior to each anneal may beneficially reduce drift in flux bias on a per qubit basis right before every anneal is performed.

It will be understood that performing method 800 using one annealing line at a time may follow a variety of schedules. For example, method 800 may be performed such that acts 802-808 are repeated n times for all of the qubits on a first annealing line (such as annealing line 221 of FIG. 2), and then acts 802-808 are performed n times for all the qubits on the next annealing line, until n cycles have been performed for all qubits on the processor. Alternatively, method 800 may be performed such that one cycle 802-808 is performed for all of the qubits on one annealing line, then one cycle is performed for all the qubits on another annealing line, etc., until all of the qubits have performed one cycle, and then this may be repeated until n cycles 802-808 have been performed for all qubits on the processor. Typically, the same number n cycles will be performed on each qubit, however, it will be understood that the number of cycles may be varied in some circumstances. For example, in some implementations it may be known that more noise occurs consistently in a given region of a quantum processor, and more cycles may be performed for qubits in that region.

Acts 802 through 808 are performed iteratively in order to load sufficient flux quanta to compensate flux noise in the qubit. The number of flux quanta that can be loaded into the storage loop will determine the maximum value of the flux bias on the qubit that the circuit can compensate. A target value may be determined by a typical flux bias value multiplied by some factor. The amplification of the current through the QFP flux pump circuit may beneficially impact the number of flux quanta that can be loaded into the storage loop before it saturates. The step size, which determines the minimum change in flux bias that can be compensated, is determined by the change resulting from a single loaded flux quanta. It is also beneficial to run these iterations quickly to continuously update the compensation of qubit flux noise, as the flux bias on the qubit will vary over time.

There are therefore three parameters associated with the flux compensation circuit to be balanced: the step size, the maximum value, and the speed of the cycle of performing acts 802 through 808. A speed of a given change in qubit flux can be compensated depends on the speed at which the cycle (acts 802-808) can be run and the step size. A smaller step size will require more steps or iterations to compensate a given change, but the size of change that can be compensated will be more accurate. That is, the minimum change in flux bias that can be compensated will be smaller with a smaller step size. A target value may be determined by an estimation of the maximum change in flux bias that does not impact the results produced by the quantum processor during problem solving. In order to provide compensation of the flux noise for a given qubit, the sign or direction of the current flowing through the QFPs is determined by the qubit state. However, eventually that will reach a maximum value for the circuit where the backaction from the stored flux overcomes the bias from the qubit. This will provide an upper range to the amount of flux bias that can be compensated by a given circuit.

When copying a state between QFPs generally, the current flowing through the CJJs of QFPs can impact the accuracy of the state copying. The process of transferring the signal as discussed above can amplify the signal by the latching of a QFP, resulting in a more robust copy operation at each successive CJJ. After the process of copying a first flux quanta through the QFPs and into the storage inductance, successive flux quanta will be loaded. As the number of flux quanta loaded into the storage inductance increases, this loaded flux quanta will begin to back act on the adjacent QFP, which will reduce the current through the CJJ of the adjacent QFP. This process will ultimately limit how much flux can be loaded into the storage inductance. The amplification of the signal to provide a large current is therefore beneficial to provide a large range of device operation.

Method 800 as discussed above allows for compensation of flux noise in a qubit that is performed entirely on chip. That is, the state of the qubit does not have to be read out to a device located at room temperature, nor is any other information required to pass from on-chip to a device located at room temperature and back again. The qubit can be annealed, and flux quanta are copied into the storage circuit without the need for an external processor or user to have observed the qubit state. Providing flux noise compensation without reading out any information to a device located at room temperature beneficially allows for flux noise compensation to be performed more quickly.

Described herein is an error suppression technique for reducing on-chip flux noise on a per qubit basis. As used herein, "on-chip" refers to something that is part of the same processor as the qubits that are subject to the compensation. A quantum processor typically includes qubits and couplers, as well as control devices and other on-chip circuits, as discussed with respect to FIG. 2. The compensation circuit described herein provides compensation of those qubits in situ, or as part of the quantum processor. In particular, many quantum processors are maintained in an isolated environment such as a cryogenic refrigerator, and the on-chip flux noise compensation can occur without the requirement for information to be read to a separate circuit or processor that is outside of the isolated environment or at room temperature. An on-chip circuit is provided for capturing and aggregating information about the qubit flux offset due to noise, and can be used to compensate that offset. The described method and devices may beneficially allow for flux noise compensation without the requirement to bring information about the qubit state off-chip or to reprogram on-chip DACs. This may beneficially allow for faster and more effective compensation of low frequency flux noise. Reduction of flux noise present in each qubit may thereby reduce problem misspecification and dephasing, improving performance of the quantum processor. Reduction in flux noise may also ease the requirements for error correction in gate model quantum computing.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the examples acts or operations of the above described method(s), process (es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned U.S. patent application publications, U.S. patent applications, foreign patents, and foreign patent applications referred to in this specification and/or listed in the Application Data Sheet are incorporated herein by reference, in their entirety, including but not limited to:

U.S. Pat. Nos. 7,533,068; 8,008,942; 8,195,596; 8,190,548; 8,421,053; 8,854,074; 9,015,215; 9,424,526; 10,528,886; 10,552,755.

International (PCT) Patent Application Publication No. WO2022155140.

U.S. Provisional Patent Application No. 63/223,686.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A quantum processor comprising:

a first qubit;

a flux compensation circuit communicatively coupled to the first qubit, the flux compensation circuit comprising:

a quantum flux parametron (QFP) flux pump circuit comprising a first QFP in communication with the first qubit, the first QFP comprising a first Josephson junction;

a storage circuit comprising a second Josephson junction and a storage loop coupled in series with the QFP flux pump circuit, the communication between the QFP flux pump circuit and the storage loop mediated by the second Josephson junction;

a first control line in communication with the first Josephson junction; and a second control line in communication with the second Josephson junction;

wherein the storage loop is communicatively coupled to the first qubit such that, in use, flux stored in the storage loop back acts on the first qubit.

2. The quantum processor of claim 1, wherein the storage loop is communicatively coupled to the first qubit through the first QFP.

3. The quantum processor of claim 1, wherein the first Josephson junction and the second Josephson junction each comprise compound Josephson junctions.

4. The quantum processor of claim 1, wherein the QFP flux pump circuit comprises a second QFP coupled in series with the first QFP, the second QFP comprising a third Josephson junction, the first QFP and the second QFP connected by an inductor.

5. The quantum processor of claim 4, wherein the QFP flux pump circuit comprises a third QFP coupled in series with the second QFP, the coupling between the second QFP and the third QFP mediated by a fourth Josephson junction.

6. The quantum processor of claim 5, further comprising a third control line in communication with the third Josephson junction and a fourth control line in communication with the fourth Josephson junction.

7. The quantum processor of claim 6, wherein the third Josephson junction and the fourth Josephson junction each comprise compound Josephson junctions.

8. The quantum processor of claim 1, wherein the quantum processor comprises a set of qubits, the first qubit being one of the qubits of the set of qubits, and wherein each qubit of the set of qubits is coupled to a respective flux compensation circuit.

9. The quantum processor of claim 1, wherein the storage loop comprises a high kinetic inductance material.

10. A flux compensation circuit comprising:

a quantum flux parametron (QFP) flux pump circuit comprising:

a first QFP, the first QFP comprising a first Josephson junction;

a second QFP connected in series with the first QFP, the second QFP comprising a third Josephson junction, the first QFP and the second QFP connected by an inductor;

a third QFP connected in series with the second QFP, the connection between the second QFP and the third QFP mediated by a fourth Josephson junction;

a storage circuit comprising a second Josephson junction and a storage loop connected in series with the QFP flux pump circuit, the connection between the QFP flux pump circuit and the storage loop mediated by the second Josephson junction;

a first control line in communication with the first Josephson junction;

a second control line in communication with the second Josephson junction;

a third control line in communication with the third Josephson junction; and a fourth control line in communication with the fourth Josephson junction.

11. The flux compensation circuit of claim 10, wherein each of the first, second, third, and fourth Josephson junctions comprise compound Josephson junctions.

12. The flux compensation circuit of claim 10, wherein the storage loop comprises a high kinetic inductance material.

13. A method of compensating flux noise in a qubit, the method comprising:

iteratively, until an exit condition is met:

projecting information about a flux state of the qubit into a quantum flux parametron (QFP) flux pump circuit;

copying the information about the flux state of the qubit through the QFP flux pump circuit as a directional current;

activating a Josephson junction coupled in series with the QFP flux pump circuit to store flux in a storage loop connected to the Josephson junction based on the directional current; and evaluating the exit condition; and communicating the flux stored in the storage loop with the qubit to reduce the flux state of the qubit.

14. The method of claim 13, wherein projecting information about the flux state of the qubit into a QFP flux pump circuit comprises annealing the qubit in a presence of ambient flux noise.

15. The method of claim 13, wherein projecting information about the flux state of the qubit into a QFP flux pump circuit comprises annealing a first QFP in communication with the qubit in a presence of ambient flux noise.

16. The method of claim 13, wherein copying the information about the flux state of the qubit through the QFP flux pump circuit as a directional current comprises:

inducing a current in a first QFP comprising a first Josephson junction based on the projected information about the flux state;

activating the first Josephson junction to latch the first QFP;

inducing a current in a second QFP comprising a second Josephson junction based on the current in the latched first QFP; and activating the second Josephson junction to latch the second QFP.

17. The method of claim 16, wherein copying the information about the flux state of the qubit through the QFP flux pump circuit as a directional current further comprises:

inducing a current in a third QFP comprising a third Josephson junction based on the current in the latched second QFP; and activating the third Josephson junction to latch the third QFP.

18. The method of claim 13, wherein evaluating the exit condition comprises incrementing a counter until a number of iterations have been performed.

19. The method of claim 13, further comprising deactivating biasing devices in communication with the qubit to isolate the qubit prior to projecting information about the flux state of the qubit.

* * * * *